US012627371B1

(12) United States Patent
Rajamani et al.

(10) Patent No.: US 12,627,371 B1
(45) Date of Patent: May 12, 2026

(54) HIERARCHICAL HANDOVER SIGNALING

(71) Applicant: Amazon Technologies, Inc., Seattle, WA (US)

(72) Inventors: Srikar Rajamani, Redmond, WA (US); Andrew B. Dickinson, Seattle, WA (US); Ali Masoomzadeh, Bellevue, WA (US); Daniel Todd Cohn, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 830 days.

(21) Appl. No.: 17/850,667

(22) Filed: Jun. 27, 2022

(51) Int. Cl.
H04B 7/185 (2006.01)
H04W 84/06 (2009.01)

(52) U.S. Cl.
CPC ..... H04B 7/18541 (2013.01); H04B 7/18521 (2013.01); H04B 7/18567 (2013.01); H04W 84/06 (2013.01)

(58) Field of Classification Search
CPC ............ H04B 7/18541; H04B 7/18521; H04B 7/18567; H04W 84/06
See application file for complete search history.

(56) References Cited

U.S. PATENT DOCUMENTS

| | | | | |
|---|---|---|---|---|
| 10,057,825 | B2 * | 8/2018 | Hayashi ................ | H04W 36/12 |
| 10,455,475 | B1 * | 10/2019 | Ahluwalia .......... | H04W 36/083 |
| 2007/0135040 | A1 * | 6/2007 | Draim ................ | H04B 7/18541 |
| | | | | 455/12.1 |
| 2008/0298593 | A1 * | 12/2008 | Shen ........................ | H04L 9/083 |
| | | | | 380/278 |
| 2017/0149677 | A1 * | 5/2017 | Barda ................ | H04W 56/0045 |
| 2017/0230104 | A1 * | 8/2017 | Purkayastha ......... | H04W 48/20 |
| 2020/0029265 | A1 * | 1/2020 | Choquette .......... | H04B 7/18528 |
| 2021/0218578 | A1 * | 7/2021 | Qiao ............ | H04W 36/008375 |
| 2022/0240151 | A1 * | 7/2022 | Yu ........................ | H04B 7/18541 |
| 2022/0368411 | A1 * | 11/2022 | Speidel .............. | H04B 7/18513 |
| 2023/0045249 | A1 * | 2/2023 | Hou .................... | H04W 36/328 |
| 2023/0092925 | A1 * | 3/2023 | Wang ...................... | G01S 19/38 |
| 2023/0171663 | A1 * | 6/2023 | Hsieh ................. | H04B 7/18513 |
| | | | | 370/316 |
| 2023/0370154 | A1 * | 11/2023 | Ciochina ............ | H04B 7/18539 |

* cited by examiner

*Primary Examiner* — Faruk Hamza
*Assistant Examiner* — Tito Q Pham
(74) *Attorney, Agent, or Firm* — Kilpatrick Townsend & Stockton LLP

(57) ABSTRACT

Technologies directed to hierarchical handover signaling methodology and systems are described. One method includes receiving, by a wireless device from a first artificial satellite, first data indicating a state of network traffic of a first set of communication channels between the first artificial satellite and each of a set of UTs at a first time. The method further includes determining second data indicating a second time, after the first time, corresponding to an upcoming event. The method may further include sending, by the wireless device to the second artificial satellite, third data indicating the first data and the second data. The third data comprises instructions that cause the second artificial satellite to allocate, based on the first state of network traffic, a second set of communication channels between the second artificial satellite and each of the set of UTs at a third time, at or subsequent to the second time.

15 Claims, 9 Drawing Sheets

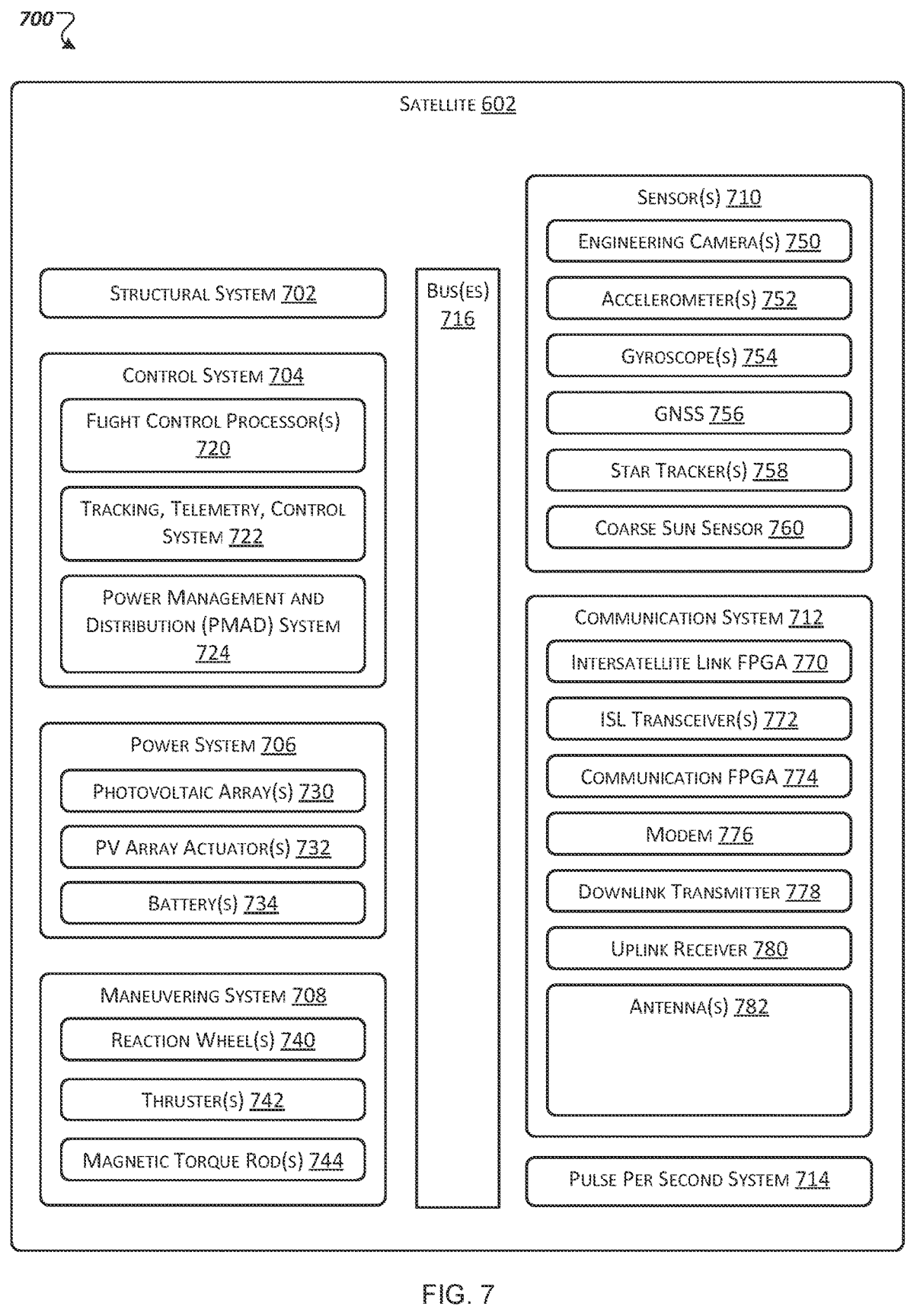

700

SATELLITE 602

STRUCTURAL SYSTEM 702

BUS(ES) 716

SENSOR(S) 710

ENGINEERING CAMERA(S) 750

ACCELEROMETER(S) 752

GYROSCOPE(S) 754

GNSS 756

STAR TRACKER(S) 758

COARSE SUN SENSOR 760

CONTROL SYSTEM 704

FLIGHT CONTROL PROCESSOR(S) 720

TRACKING, TELEMETRY, CONTROL SYSTEM 722

POWER MANAGEMENT AND DISTRIBUTION (PMAD) SYSTEM 724

COMMUNICATION SYSTEM 712

INTERSATELLITE LINK FPGA 770

ISL TRANSCEIVER(S) 772

COMMUNICATION FPGA 774

MODEM 776

DOWNLINK TRANSMITTER 778

UPLINK RECEIVER 780

ANTENNA(S) 782

POWER SYSTEM 706

PHOTOVOLTAIC ARRAY(S) 730

PV ARRAY ACTUATOR(S) 732

BATTERY(S) 734

MANEUVERING SYSTEM 708

REACTION WHEEL(S) 740

THRUSTER(S) 742

MAGNETIC TORQUE ROD(S) 744

PULSE PER SECOND SYSTEM 714

FIG. 7

HIERARCHICAL HANDOVER SIGNALING

BACKGROUND

Satellite-based communication systems can include gateways and one or more satellites to relay communication signals between the gateways and one or more user terminals (UTs). A gateway is an earth station with an antenna to transmit signals to, and receive signals from, communication satellites. A gateway provides communication links using satellites to connect a user terminal to other user terminals or to users of other communication systems, such as a public switched telephone network, the Internet, and various public and/or private networks. A satellite is an orbiting receiver and repeater used to relay information. In non-geosynchronous satellite-based systems, such as Low Earth Orbit (LEO) satellite-based systems, satellites move relative to terrestrial communication devices such as gateways or user terminals. Therefore, a UT will be handed over from one satellite to another at some point.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 7 is a functional block diagram of some systems associated with the satellite, according to some implementations.

Figure 1:
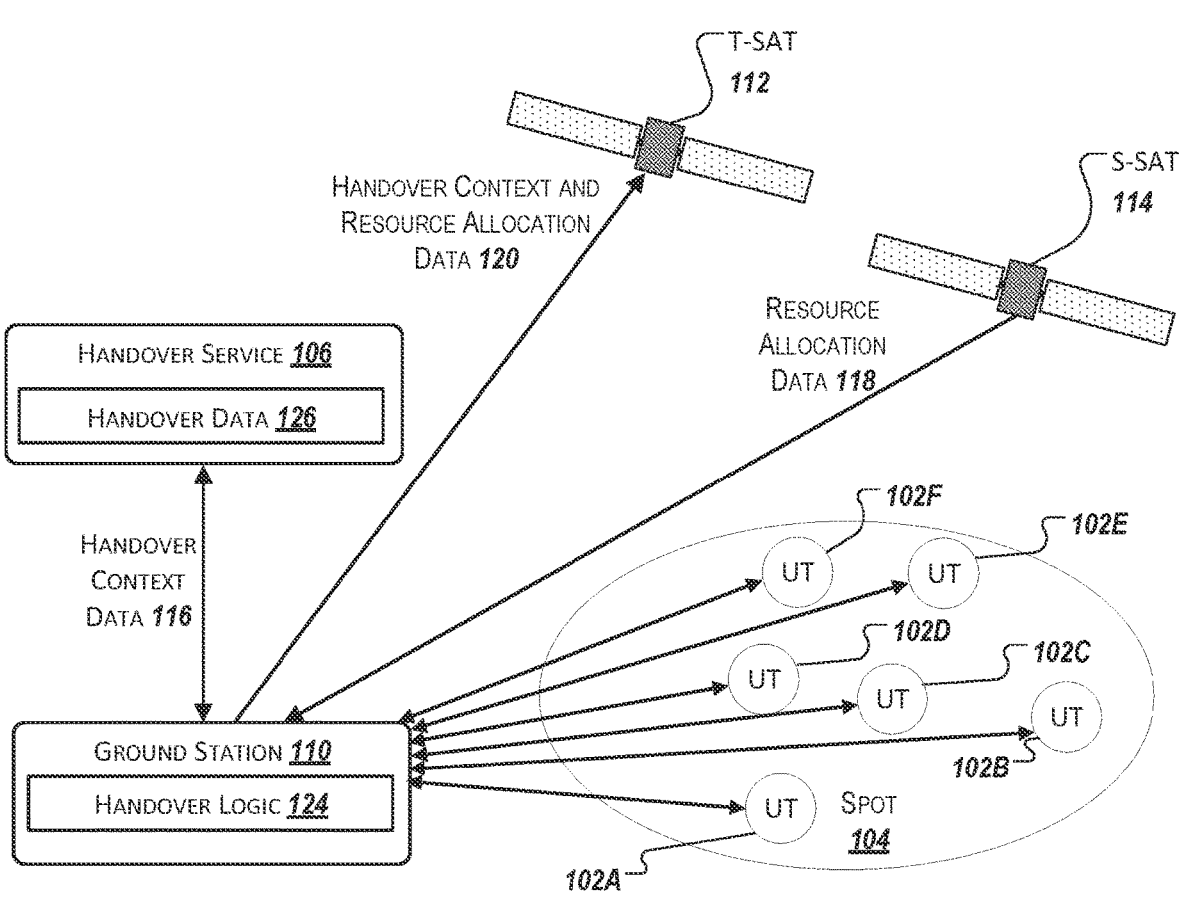
FIG. 1 illustrates a hierarchical handover signaling system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals (UTs) and ground stations that, in turn, connect to other networks, such as the Internet. Compared to terrestrial wireless systems, the cost to place and maintain individual satellites, the large geographic coverage area of a given satellite, and a substantial number of user terminals served by each satellite, may require precise coordination between satellites to ensure network coverage and performance are maintained across various terrestrial regions. A common procedure among satellite systems is exchanging communication responsibilities of individual satellites through a handoff or handover procedure. In telecommunications, handover, or handoff, is the process of transferring an ongoing call or data session from one channel connected to the core network to another channel. In satellite communications, it is the process of transferring ground communication responsibility from one artificial satellite to another without loss or interruption of service.

Satellites provide communication services between devices, such as user terminals (UT) located on or near a body such as the Earth. For example, a first UT on a first geographic location (geolocation) on the Earth may send upstream data to a first satellite (e.g., artificial satellite, aerial vehicle, etc.) that is in range of the first UT. The first satellite may send the upstream data to a ground station, another satellite, and so forth. For example, the first satellite may send the upstream data to a ground station that in turn sends the upstream data to a point-of-presence (PoP) system. The PoP system may then send the upstream data to a device on another network, such as a server on the Internet. The PoP system may include an artificial demarcation point or network interface point between the communicating entities.

Likewise, downstream data destined for the first UT may be received at the PoP system. The PoP system sends the downstream data to the ground station that, in turn, sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determine how long a satellite is within range of the UT is the orbital period of the satellite, which is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors, including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth.

While the apparent motionlessness with respect to the UT removes the need for handoffs, other drawbacks associated with the geosynchronous satellite remain.

Signals between the UT and the satellite are limited to traveling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) artificial satellite at an altitude of 600 km only introduces about 4 ms of latency, including 2 ms up to the satellite and 2 ms down to the UT. However, the latency does vary as the distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving the usefulness of the communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite. For example, as mentioned earlier, the use of many NGO satellites may require the use of coordinated handover between satellites to provide a spot (e.g., a set or collection of UTs) for consistent data coverage. As expressed previously, an individual satellite is only within the communication range of a UT for a few minutes. Efficient coordination and management of the uplink between satellite handoffs become particularly important in this dynamic environment as poor management reduces throughput on the uplink. Reduced throughput may result in data being delayed, dropped, or other unacceptable outcomes.

Traditional techniques for network access handoff are not intended for and do not scale well when communication distance becomes large, for example, when a ground station or UT exchanges data with a satellite using an uplink and/or downlink communication channel. Conventional handoff procedures, such as, for example, those used in 5G networks, often include a request and a corresponding acknowledgment to transfer a current session from a current channel to an updated channel. Due, at least in part, to the travel distance and orbital motion of satellites using a conventional approach would produce significant downtime of the uplink. Delays in signals handover instructions, handover contextual data, and network traffic may result in lost time to use the uplink and exchange data packets.

Aspects of the present disclosure overcome deficiencies of conventional handover technologies by providing a satellite handover signaling method, system, and devices providing hierarchical handover signaling in carrying out a satellite handover event. Aspects of the present disclosure introduce handover signaling techniques and handover devices to signal handover-related states at or near a time of a handover event. Handover-related states may include a state of network communication associated with a currently servicing satellite for a given service region. In some aspects of the present disclosure, a satellite or ground-based entity (e.g., a UT or a gateway (GW) device) may generate network traffic data that may include indications of an upcoming radio frequency (RF) communication resource allocations schedule for a currently servicing satellite.

In the context of a handover event, one or more ground-based entities and/or currently servicing satellites may generate data (e.g., a report, communication map, etc.) that indicates the upcoming RF communications resource allocations. For example, the data may indicate a data buffer status (e.g., an indication of buffer depth) for one or more UTs in a given spot. The RF communication resource allocation may be relayed with contextual handover data indicating details of an upcoming handover event to a target satellite via one or more UTs, a PoP device (e.g., an network access point), and/or directly to the target satellite without the use of a ground-based entity (e.g., using an intersatellite link (ISL)). The target satellite may perform the handover with the previous satellite and may leverage the traffic data and allocate RF communication resources (e.g., one or more data communication channels) based on the RF traffic data (e.g., proportional to the RF communication resources received in the resource allocation data). For example, UTs that have data buffered and are ready to communicate with the prior serving satellite may be allocated RF communication resources by the newly servicing satellite in quick succession of the handover event. The transfer of a communication state corresponding to communication between the first satellite and the UTs of an associated spot may allow the second satellite to prepare to receive data packets from the UTs in quick succession of the handover event, which can result in more efficient use of signal uplink bandwidth compared to conventional handover procedures.

In an example embodiment, a communication system may comprise a first artificial satellite comprising first radio frequency (RF) circuitry and a first processing device coupled to the first RF circuitry. The first processing device is configured to exchange first data packets between the first artificial satellite and individual user terminals (UTs) of a set of UTs prior to a handover event between the first artificial satellite and a second artificial satellite. The communication system may further include the second artificial satellite comprising second RF circuitry and a second processing device coupled to the second RF circuitry and exchange second data packets between the second artificial satellite and the individual UTs of the set of UTs subsequent to the handover event. The communication system may further include a ground station communicatively coupled to the first artificial satellite, the second artificial satellite, and the set of UTs.

The ground station may include third RF circuitry and a third processing device coupled to the third RF circuitry. The third processing device receives, from the first artificial satellite, first data indicating a first allocation of RF communication resources of the first RF circuitry to one or more UTs of the set of UTs at a first time. The first allocation corresponds to an uplink data buffer status (DBS) (e.g., corresponding data uplinks) representative of an amount of traffic on corresponding data communication channels between the first artificial satellite and each of the UTs at the first time. The third processing device further determines second data indicating a predicted position and a predicted velocity of the first artificial satellite at a second time, after the first time, corresponding to the handover event. The third processing device further sends, to the second artificial satellite, third data comprising the first data and the second data, wherein the third data comprises instructions that cause the second artificial satellite to allocate RF communication resources of the second RF circuitry according to a second allocation based on the first allocation at a third time at or subsequent to the second time.

In some embodiments, a first UT of the set of UTs comprises the ground station. The first artificial satellite may send to the second artificial satellite, using an intersatellite link (ISL), fourth data identifying the first UT. The fourth data may comprise instructions that cause the second artificial satellite to allocate a first data communication channel between the second artificial satellite and the first UT at a fourth time at or before the third time.

In another example embodiment, a method may include receiving, by a wireless device from a first artificial satellite, first data indicating a state of network traffic of a first set of communication channels between the first artificial satellite and each of a set of UTs at a first time. The method may further include determining, by the wireless device, second data indicating a second time, after the first time, corresponding to an upcoming event, wherein the first artificial satellite is configured to exchange first data packets with individual UTs of the set of UTs prior to the upcoming event and the second artificial satellite is configured to exchange second data packets with the individual UTs of the set of UTs subsequent to the upcoming event. The method may further include sending, by the wireless device to the second artificial satellite, third data indicating the first data and the second data. The third data comprises instructions that cause the second artificial satellite to allocate, based on the first state of network traffic, a second set of communication channels between the second artificial satellite and each of the set of UTs at a third time, at or subsequent to the second time.

FIG. 1 illustrates a hierarchical handover signaling system 100, according to some implementations. The hierarchical handover system 100 may include a handover service 106 that coordinates a satellite handover procedure (e.g., using handover data 126) between a serving satellite 114 (sometimes referred to as "S-SAT") and a target satellite 112 ("sometimes referred to as "T-SAT"). A handover, or hand-off, is the process of transferring an ongoing call or data session from one channel connected to the core network to another channel. In satellite communications, it is the process of transferring ground communication responsibility from one artificial satellite to another without loss or interruption of service.

Handover signaling system 100 may utilize satellites 112, 114 to wirelessly transfer data between user terminals (UTs) 102A-F and ground station(s) 110. For example, a first UT 102A on a first geographic location (e.g., spot 104) on the Earth may send upstream data to a first satellite 114 (e.g., artificial satellite, aerial vehicle, etc.) that is in range of the first UT 102A. The first satellite may send the upstream data to a ground station 110, another satellite 112, and so forth. For example, the first satellite may send the upstream data to a ground station 110 that serves as a point of presence (PoP) and/or access point (AP) to the UTs 102A-F. Likewise, downstream data destined for the first UT may be received at the ground station 110 (e.g., acting as a PoP). The ground station 110 may send the downstream data to an associated UT 102A-F.

In some embodiments, hierarchical handover signaling system 100 uses radio frequency (RF) signals (e.g., using RF circuitry at each of satellite 112, satellite 114, and ground station 110, etc.) to exchange data (e.g., relay messages) between one or more identified wireless communication entities. One or more of the communication entities (e.g., satellite 112, satellite 114, and ground station 110, UTs 102A-F) may comprise a processing layer responsible for controlling the physical transmission medium in local networks. For example, a Media Access Control (MAC) processing layer that is responsible for terminating RF links between the entities (e.g., a satellite 112 and a UT 102A) may be used for quick communication of handover data and/or traffic data.

In some embodiments, one or more satellites (e.g., using an associated MAC layer) allocates blocks of downlink RF resources to each UT 102A-F of the spot 104. This allocation may be expressed as a map of UT identifications (IDs) to resource blocks. This allocation, sometimes referred to as a downlink map, can be leveraged to determine a satellite MAC processing layer may schedule packets for communication between the satellite and each UT. In some embodiments, each satellite 112, 114 may compute an uplink map for all of the UTs 102A-F in the spot 104. This uplink map may be representative of a schedule of when each UT in the spot 104 is authorized (e.g., granted resources) to transfer data with the satellite.

In some embodiments, a serving satellite 112 may compute the uplink map by tracking each UT's buffer data status (BDS). A BDS for a given UT 102A provides an indication of a buffer depth or amount of data queued for transmission between the given UT 102A and the satellite 112. For example, the serving satellite may include a scheduler tool (e.g., on the MAC processing layer) that is responsible for allocating RF resources for each UT 102A-F of the spot 104. The BDS is an indicator of an amount of traffic on a given link between the satellite and a particular UT 102A.

One or more uplinks or downlinks between one or more UTs 102A-F and one or more satellites 112, 114 may comprise a plurality of channels (sometimes referred to as RF communication resources). A channel may be a particular combination of one or more of a frequency, time division, modulation, access modalities, and so forth. During operation of the UT 102A-F, one or more of ground station 110 and/or UTs 102A-F may determine a buffer data status (BDS) that corresponds with individual UTs 102A-F of the spot 104. This BDS may be communicated to a currently serving satellite and relayed to the target satellite 112

In some embodiments, an uplink may also include one or more grant channels. Depending upon the implementation, a UT 102A-F may be allocated one or more grant channels. A grant channel is specified by communication resources specified by the grant data. For example, grant data may specify communication resources for the uplink that are assigned to the UT 102A-F, such as a timeslot, frequency slot, modulation, coding scheme, and so forth.

For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determines how long a satellite is within range of the UT is the orbital period of the satellite, which is determined by the altitude of the satellite.

Satellites 112, 114 may move between an "in range" state and "out of range" regularly, such as through motion along a planned orbiting trajectory. Handover service 106 includes handover data 126 that stores a handover schedule indicating one or more instances of handover procedures between satellites. For example, the handover data 126 may indicate when satellites 112, 114 are in range of a given spot 104 of UTs 102A-F and when a serving satellite 114 will no longer be in range. The handover data 126 may further identify target satellites 112 that perform a handover procedure with a serving satellite 114 to take of data exchange responsibilities with a spot 104 of UTs 102A-C. In some embodiments, the handover data 126 indicates a context of a handover procedure, such as, for example, indicating a time of a handover event, a predicted location of the serving satellite 114 and/or target satellite 112, a predicted speed of the serving satellite 114 and/or target satellite 112, and the like.

A handover process can be disruptive to ongoing communication and planned upcoming communication to which RF communication resources have been granted. In some embodiments, due to the disruptive nature of a handover process, the handover system may attempt to minimize a frequency of handover procedures over a period of time, such as, for example, to maximize communication time between a given satellite 112 and a spot 104 of UTs 102A-F before switching to a new satellite 114.

As shown in FIG. 1, ground station 110 may include handover logic 124. The handover logic 124 may be triggered based on a handover schedule provided by handover service 106 (e.g., through handover data 126). Handover logic 124 includes executable instructions that are processed by the ground station 110 to facilitate a handover of data communication responsibilities (e.g., uplinks/downlinks with the UTs) of spot 104 from the serving satellite 114 to target satellite 112. For example, serving satellite 114 may be moving to a position outside a range to adequately fulfill data communication responsibilities at a threshold level of quality and/or consistency.

In handover operation, serving satellite 114 determines resource allocation data 118 and communicates the resource allocation data 118 to ground station 110. As previously described, satellites (such as serving satellite 114) may communicate with UTs by granting RF communication resources). The allocated resources are indicative of overall network traffic (e.g., quantities of data to be sent between individual UTs and a satellite). For example, at a given moment of time, a varying number of UTs may be allocated RF resources for upcoming uplink data transmission. In some embodiments, satellite 114 may receive and determine a buffer data status (BDS) that indicates a buffer depth or amount of data a UT has queued or otherwise prepared to send to the satellite. The resource allocation data 118 may be associated with a BDS of individual UTs 102A-F at a moment in time, or as will be discussed further in other embodiments, historical communication pattern may be leveraged to infer resource allocation data 118 in view of a current state of the BDS of corresponding UTs 102A-F.

In some embodiments, the satellite (e.g., using a MAC processing layer) tracks each UT's transmit buffer to estimate the number of resource blocks the satellite allocates to the UT. The UT's may signal (e.g., using a MAC processing layer) a corresponding transmit/uplink buffer depth to the satellite (e.g., using a MAC-MAC signaling message). The satellite tracks each BDS and can maintain the buffer information as a map indexed by a UT-ID.

In some embodiments, the link quality between the satellite 114 and individual UTs 102A-F can constantly change (e.g., due to weather, orbiting trajectory, etc.). The satellite 114 may periodically obtain BDS data and update an internal mapping of buffer depth to UTs from time to time (e.g., as the data is received).

In some embodiments, resource allocations may be determined based on the flow control mechanism employed by the ground station 110 and/or the serving satellite 114. A flow control mechanism may include data flow constraints placed on individual UTs limiting a rate of data flow between the UT and satellite 114. For example, data flow constraints may correspond to subscription details of a given UT, hardware constraints associated with the given UT, and/or signal connectivity constraints between the ground station 110 and a given UT 102A.

As shown in FIG. 1, the ground station 110 (e.g., using handover logic 124) receives the resource allocation data 118. The ground station 110 further receives handover data 126 from handover service 106. The ground station 110 sends data 120, including handover data and resource allocation data, to the target satellite 112.

In some embodiments, the ground station operates as a PoP between the satellites 112 and 114 and the spot 104 of UTs 102A-F. For example, the ground station 110 may backhaul communication of the UTs 102A-F. The ground station 110 may store a history of communications by the UTs 102A-F. In some embodiments, the ground station 110 may leverage the history of communication by the UTs 102A-F to determine one or more historical patterns corresponding to individual UTs 102A-F. In some embodiments, the ground station 110 may leverage operational states (e.g., a power operational state such as a low-power mode, a sleep mode, or a half-duplex mode) to alter instructions provided to the first satellite 114 in allocating RF resources after the handover event.

As shown in FIG. 1, satellite 112 receives data 120, indicating the handover data and resource allocation data. The second satellite can leverage data 120 to prepare and carry out its portion of the handover procedure. For example, satellite 112 may alter an orbiting trajectory to prepare for taking over data exchange responsibilities with the spot 104 of UTs. The satellite may allocate RF resources based on the allocation data. For example, after satellite 112 takes over communication responsibilities with spot 104, the satellite may leverage existing and/or upcoming communication resources allocated by satellite 114 and allocate analogous RF resources (e.g., using the same frequency, amplitude, modulation, time slots, etc.) with RF circuitry of the second satellite.

In some embodiments, after target satellite 112 takes over communication responsibilities, the target satellite leverage a BDS map for the spot to determine the uplink resource allocation for each UT. For example, the target satellite 112 may allocate RF communication resources proportional to UT uplink buffer depth. The target satellite 112 may allocate these described resources at or before the time of the handover event, such as, for example, to prevent data packets from getting dropped or timed out based on a delay between allocated resources of the first satellite and allocated resources by the second satellite.

The target satellite sends a message to the UTs indicating the satellite is ready to take over communication for the spot 104. In some embodiments, at the handover transition, the target satellite 112 may account for "in-flight" packets (e.g., packets already transmitted by the UT and on their way to the serving 114) by buffering a take-over message to the UTs 102A-F to compensate for the propagation delay. For example, the target satellite 112 may leverage the target position and target velocity of the serving satellite 114 to determine an exact handover moment to prevent loss of data or other communication degradation due to handover-related communication latency.

In some embodiments, the takeover communication for the spot 104 include communication parameters such a decryption key associated with communications between the target satellite and the UTs. The decryption key may be an indicator and/or marker for the UTs to halt communication with the serving satellite and/or initiate communication with the target satellite. The decryption key may permit the UTs capacity to decrypt communications from the second satellite. In some embodiments, the a selection of the data received from the second satellite is only able to be read/decrypted once the decryption key has been received by a corresponding UT.

Figure 2:
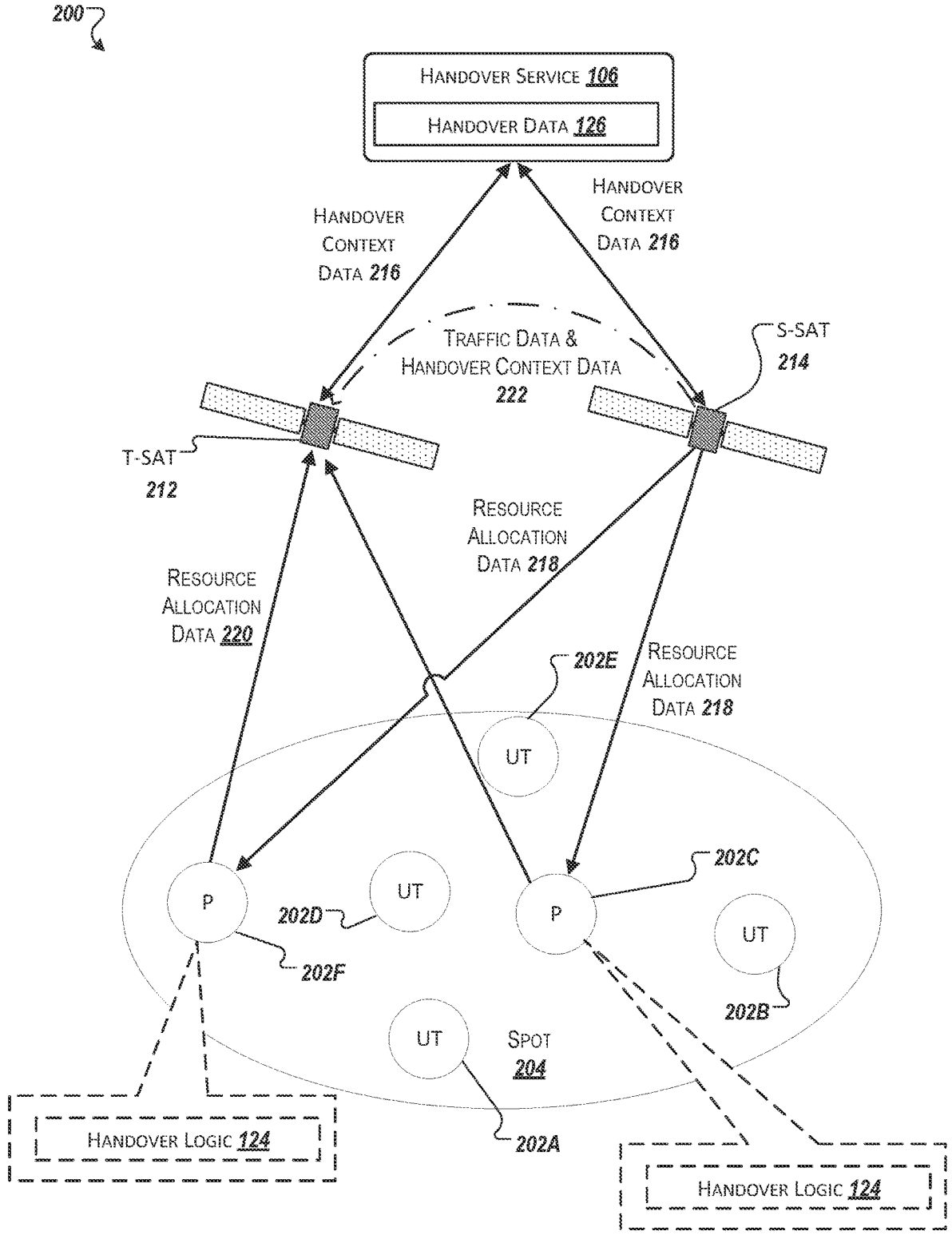
FIG. 2 illustrates a hierarchical handover signaling system, according to some implementations.

FIG. 2 illustrates a hierarchical handover signaling system 200, according to some implementations. The hierarchical handover signaling system 200 may include a target satellite 212 that may include one or more features of target satellite 112, a serving satellite 214 that may include one or more features of serving satellite 114, and a spot 204 of UTs 202A-F.

As shown in FIG. 2, one or more UTs may include handover logic 124 and may assist in carrying out a handover procedure between the serving satellite 214 and the target satellite 212. The UTs (e.g., UT 202F and 202C) may include handover logic 124 and receive resource allocation data 218. These UTs may be referred to as "pilot" UTs and may receive resource allocation data 218 from the serving satellite 214 and send the resource allocation data 220 to the target satellite 212.

In some embodiments, the pilot UTs 202C, 202F are selected by a handover service (e.g., handover service 106 of FIG. 1) and/or the serving satellite from a selection of UTs 102A-F from the spot 204. In selecting pilot UTs 202C, 202F, the satellite may leverage information associated with the UT such as active transmission time, historical communication loads, context of the UT such as, for example, hardware specifications, ownership of the UT, location of the UT within the spot, and the like. In some embodiments, the handover service communicates the identities of each of the pilot UTs to both satellites. In some embodiments, the target satellite 112 receives the identities of the pilot UTs through an ISL between the serving satellite 114 and the target satellite.

On the ground, the pilot UT may receive (e.g., through a MAC processing layer) instructions to carry out the pilot UT responsibilities. As described earlier, the serving satellite may receive a BDS message from each UT and use the BDS messages to compute uplink grants to each UT. Before an imminent handover, the serving satellite 114 sends a BDS map (e.g., a mapping of network traffic status between the serving satellite 114 and each of the UTs 202A-F) to each of the pilot UTs 202C, 202F, where they are cached until the target satellite 212 take over communication responsibilities with the spot 204 from the serving satellite 214. The target satellite 212 prioritizes granting uplink resources to the pilot UT upon handover of communication responsibilities. As soon as the target satellite takes over communication responsibilities with the spot 204, the pilot UTs 202C, 202F, with the newly granted uplink resources, can transmit to the target satellite 212 and relay the resource allocation data (e.g., a mapping of network traffic status between the serving satellite 114 and each of the UTs 202A-F). The target satellite leverages the resource allocation data 222 to rebuild all the handover context the satellite needs to serve the Spot 204 and enable a minimally disruptive handover (e.g., minimal packet loss, communication downtime, efficient use of uplink resources, etc.).

In some embodiments, communication between the satellites 212, 214 and the ground entities (e.g., UTs 202A-F) may include encrypted communications (e.g., encrypted data). For example, the resource allocation data 218 sent by the serving satellite 214 and received by the pilot UTs 202C may be encrypted. In some embodiments, the pilot UTs may relay the resource allocation data 218 to the targeting satellite 212 without decrypting the received data.

Figure 3:
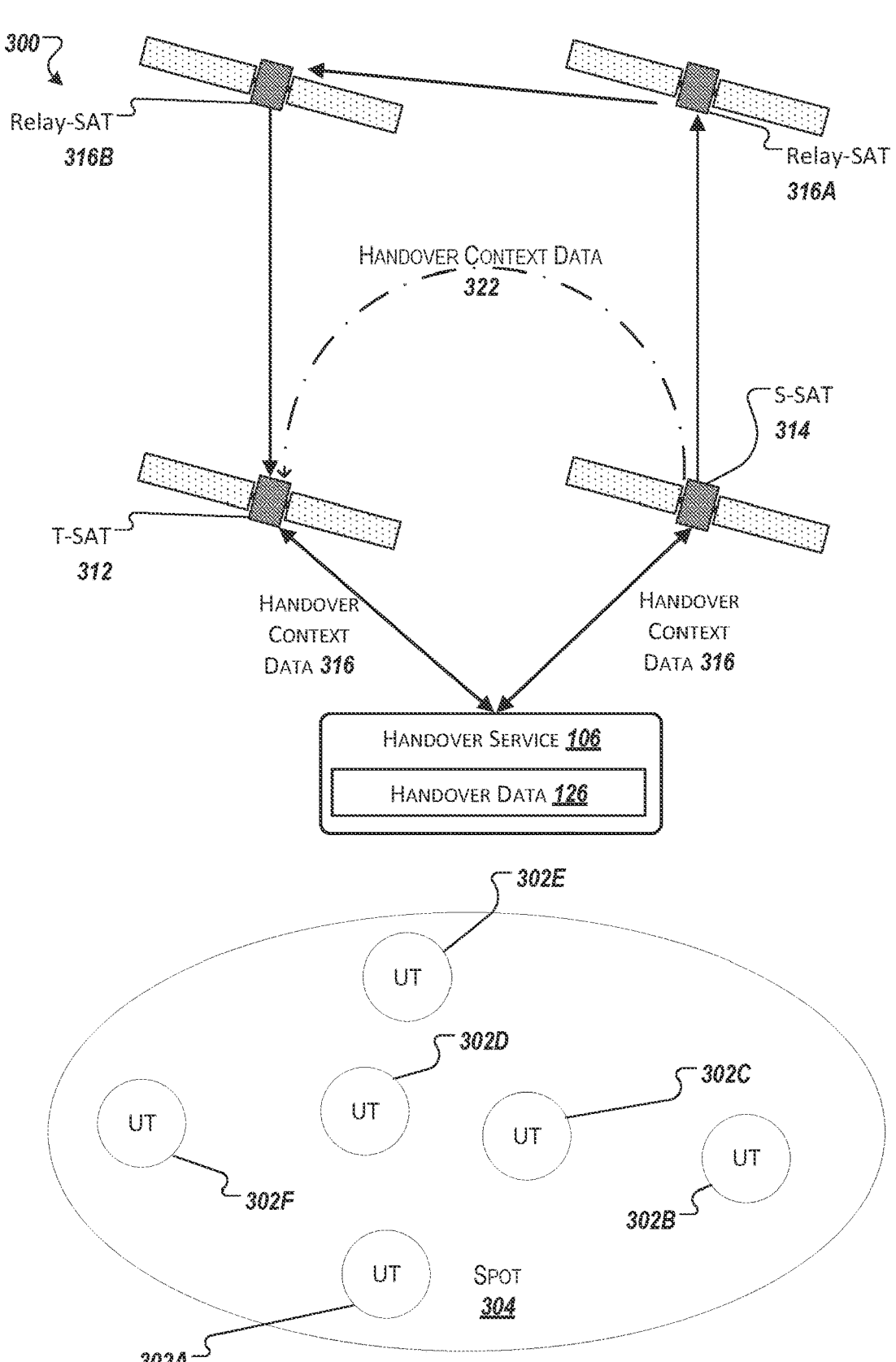
FIG. 3 illustrates a hierarchical handover signaling system, according to some implementations.

FIG. 3 illustrates a hierarchical handover signaling system 300, according to some implementations. The hierarchical handover signaling system 300 may include a target satellite 312 that may include one or more features of target satellite 212 and/or 112, a serving satellite 314 that may include one or more features of serving satellite 214, 114, and a spot 304 of UTs 302A-F.

As shown in FIG. 3, the serving satellite 314 may communicate handover context data to the target satellite 312 using an ISL 322. For example, the handover context data may be communicated from the serving satellite 314 to the targeting satellite 312 via one or more relay satellites.

In some embodiments, each satellite 312, 314, 316A-B may include multiple optical links and can establish a peering relationship with other satellites. An agent of the serving satellite may communicate a locally computed handover state to the target satellite over an optical ISL link.

In some embodiments, the communications described in association with hierarchical handover signaling systems 100, 200, and/or 300 may be used together. For example, a handover service and/or an agent of the serving satellite, 114, 214, and 314 may determine conditions of a state of the target satellite such as for example, current and/or predicted location, current and/or predicted speed and make a determination on how to communicate to the serving satellite. For example, the serving satellite may communicate handover data and/or resource allocation data to the target satellite via a ground station 110, a pilot UT 202C, 202F, ISL (e.g., directly or through relay satellites 316A-B). Conditions for each method may be determined, and an optimized communication may be determined. For example, communication metrics such as quality, latency, efficiency, positions of neighboring satellites, availability of ground stations, and/or pilot UTs may be determined in selecting a method for communicating handover data and/or resource allocation data from a serving satellite 114, 214, 314 to a target satellite 112, 214, 314.

Figure 4:
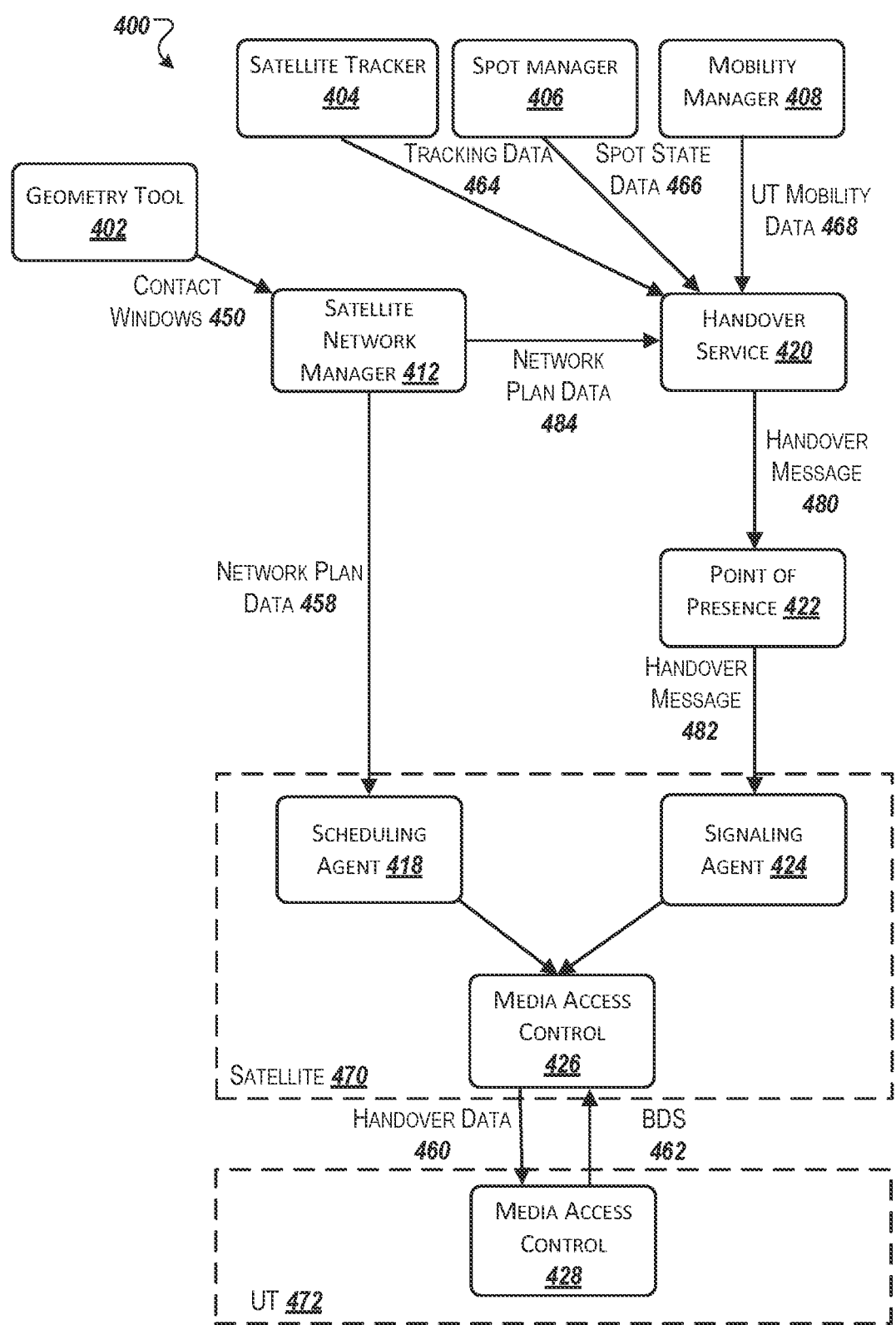
FIG. 4 illustrates a hierarchical handover signaling system architecture, according to some implementations.

FIG. 4 illustrates a handover signaling system architecture 400, according to some implementations. One or more of the services, engines, tools, and processing components, may be implemented by a handover system or service (e.g., handover service 106 of FIG. 1). The handover signaling system architecture 400 may include a geometry tool 402 and a satellite network manager 412. The satellite network manager 412 may include logic and/or data configured to create and/or maintain associations between satellite and spots (e.g., spot 104 of FIG. 1) satellite to a gateway (e.g., ground station 110 of FIG. 1). The satellite network manager 412 may leverage geometry between satellites and UTs, weather patterns, and throughput demand of each spot of UTs to determine one or more satellites' capability of serving a cell or spot of UTs. The satellite network manager 412 may determine the period of time a satellite may satisfy conditions for servicing a cell of UTs and further determines future satellites ("target" satellites) that may be capable of taking over communication responsibilities for a given cell. The beam planner generates a series of plans for satellites to collectively work together to service a cell or region of UTs.

In some embodiments, the satellite network manager 412 may receive data from the geometry tool 402 that evaluates the relative locations of satellites and ground cells and determines communication vectors between them. The geometry tool 402 may provide as output contact windows 450 indicates instances where a position and/or trajectory of a satellite is such that the satellite may be a candidate for servicing a given cell or selection of UTs. The geometry tool may further analyze a communication angle between the satellite and a specific ground and determine a throughout for a given satellite and ground cell relationship.

The satellite network manager 412 may include a database of available links between satellite and ground cells. The satellite network manager 412 may evaluate a set of possible candidate links and put a series of relationships together. The satellite network manager 412 may evaluate communication requirements between satellites-to-ground cell links required to meet desired communication criteria. For example, the routing engine may determine what communication channels are needed to communicate to the satellites and facilitate a handover procedure. The satellite network manager 412 encapsulates network plan data 456 for delivery to a network of satellites. The node communicator includes communication channels for communicating with a satellite 470. The satellite network manager 416 may include one or more sockets for communicating with the satellite 470.

The scheduling agent 418 of satellite 470 receives the network plan data 458 and communicates operations (e.g., altering the trajectory, communication patterns, etc.) to prepare the satellite for upcoming handovers. The scheduling agent 418 may include a schedule for the satellite to provide communication resources to a ground cell of UTs. The scheduling agent 418 conveys information to satellite operations to prepare for and carryout communication responsibilities according to the network plan data 458.

The scheduling agent communicates the network plans to the media access control 426 of the satellite 470. The satellite network manager 412 further sends network plan data 484 to handover service 420. The graph data 484 indicates a schedule on when satellites start and stop servicing a ground cell.

The handover signaling architecture 400 further includes a satellite tracker 404 that tracks the statuses of the many satellites in the constellation. The satellite tracker 404 may survey individual satellites and determine a current status, such as a current position, speed, etc., indicating a trajectory of the satellite. The satellite tracker may predict future positions and speeds of the satellite along the orbital trajectory. The satellite tracker 404 conveys the above tracking data 464 to the handover service 420.

The handover signaling architecture 400 includes a spot manager 406 that monitors a status of a spot 406. The spot manager sends spot state data 466 to the handover service. The spot manager 406 indicates a communication state of the spot 466

Then handover signaling architecture 400 includes a mobility manager 408 that monitors a mobility status of one or more UTs of a spot. The mobility manager 408 tracks information about the movement of individual UTs within a spot and provides the data to UT mobility data 468 to the handover service 420.

The handover service 420 receives the tracking data 464, the spot state data 466, the UT mobility data 468, and the graph data 484 and determines instructions for carrying out an upcoming handover procedure (e.g., timing data, location data, predicted state of the spot and UT the time of handover, etc.). The handover service passes the handover message 480, including the above-described instruction, to the signaling agent 424 on the satellite via a point of presence device 422. The point of presence device 422 relays the handover message 482 to the signaling agent 424 of the satellite 470.

The signaling agent 424 signals to the satellite of upcoming handover events and context data associated with the upcoming handover events. The signaling agent 424 triggers instructions for the media access control 426 of the satellite to communication handover data 460 with the media access control 428 of individual UTs 472. The UTs communicate BDS data back to the satellite. The satellite uses the network plan data, the signal agent data, and the BDS data to carry out a handover procedure and prepare communication channels to provide a seamless transition between satellites for a given ground cell.

Figure 5:
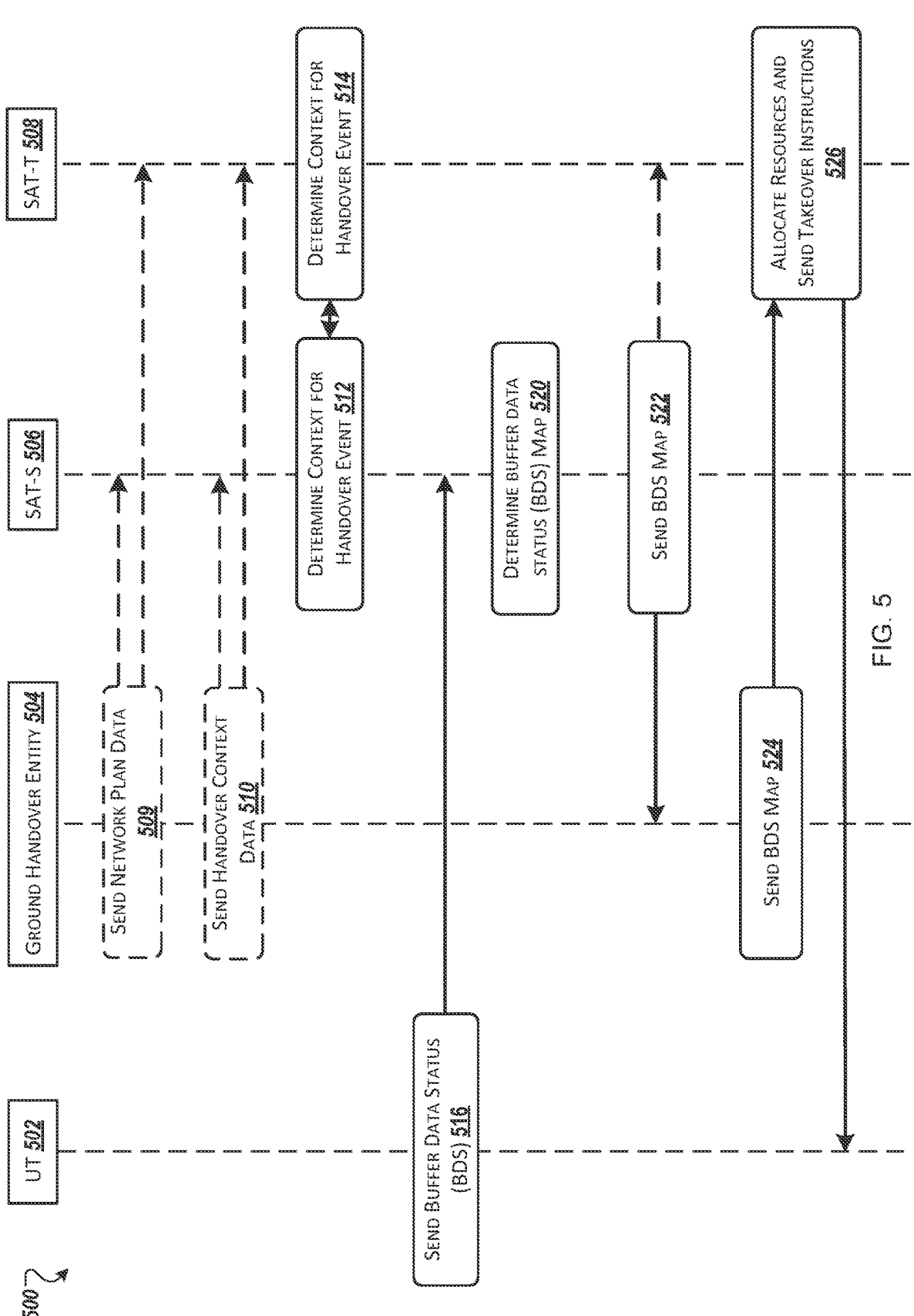
FIG. 5 illustrates a process of performing a satellite handover procedure, according to embodiments of the present disclosure.

FIG. 5 illustrates a process 500 of carrying a satellite handover procedure, according to embodiments of the present disclosure. Process 500 may be implemented by one or more UTs 502, a ground handover entity 504 (e.g., a ground station, a pilot UT, a gateway, a PoP device, wireless device, and/or the like), a serving satellite (SAT-S) 506, a target satellite (SAT-T) 508. In this illustration, time generally increases from top to bottom. For example, an operation depicted at the top of the page may occur before an operation depicted at the bottom of the page.

In some embodiments, a handover event may be coordinated using a handover service or logic stored on one or more of the ground handover entity 504, SAT-S 506, and/or SAT-T 508. For example, at block 509, the ground handover entity may send network plan data 509 to one or more of SAT-S 506 and/or SAT-T. The network plan data may include network plan data 458, 484, as previously described. At block 510, the ground handover entity 504 may send handover context data to one or more of the SAT-S 506 and/or SAT-T 508. The handover context may include information about a context of a handover event, such as, for example, a time of the handover event, an identified spot of UTs 502, a current and/or predicted location of the SAT-S 506 and/or SAT-T 508 at or proximate the time of the handover event.

In some embodiments, as shown at blocks 512 and 514, SAT-S 506 and SAT-T 508 determine a context for the handover event, this may be based on the handover context data sent from the ground handover entity 504 (at block 510). The SAT-S 506 and SAT-T 508 may communicate a context and/or status of each of the satellites between one another using an ISL (e.g., an optical ISL).

As shown in FIG. 5, at block 516, the one or more UTs 502 send a buffer data status (BDS) to the SAT-S 506. In some embodiments, the ground handover entity 504 receives the BDS data and relays the DBS data to the SAT-S 506. For example, the ground handover entity 504 may perform as a PoP device, an access point (AP) device, and/or the like between the UTs 502 and the SAT-S 506. As noted in other embodiments, the DBS data may indicate an amount of traffic on a link between an individual UT 502 and SAT-S 506. For example, the DBS data may indicate a buffer depth or amount of data allocated to UT at a given time.

At block 520, The SAT-S 506 determines a BDS map based on the BDS data. The DBS map may indicate a mapping of RF communication resources allocated to individual UTs. For example, the DBS map may indicate a relative buffer size and/or block of data queued for transmission from an individual UT to the SAT-S 506.

At block 522, the SAT-S 506 sends the BDS map to the ground handover entity 504. Alternatively and/or additionally, the SAT-S 506 may send the BDS map directly to the SAT-T, such as through an ISL or through a satellite relay communication using one or more relay satellites.

At block 524, the ground handover entity 504 sends the BDS map to SAT-T 508. In some embodiments, the ground handover entity 504 may update the BDS map using historical communication patterns of the one or more UTs 502. For example, the ground handover entity 504 may backhaul the communication between the UTs 502 and the SAT-S 506 and may leverage the historical communication between the UTs 502 and/or SAT-S and update the DBS map in view of the historical communication patterns. In some embodiments, optimization logic, machine learning algorithms, and statistical analysis may be used to predict upcoming communication loads of individual UT 502 and leveraged to provide updates to the BDS map.

At block 526, the SAT-T 508 allocates resources and sends takeover instructions. The SAT-T 508 may allocate communications resources to the UTs 502 based on the corresponding buffer depth (e.g., the amount of traffic upcoming on communication links between the UT 502 and the SAT-T 508). The takeover instructions indicate to the UT 502 that the SAT-T has taken over communication responsibility with the UT 502. In some embodiments, the takeover instructions are relayed to the UT 502 through the ground handover entity 504.

Figure 6:
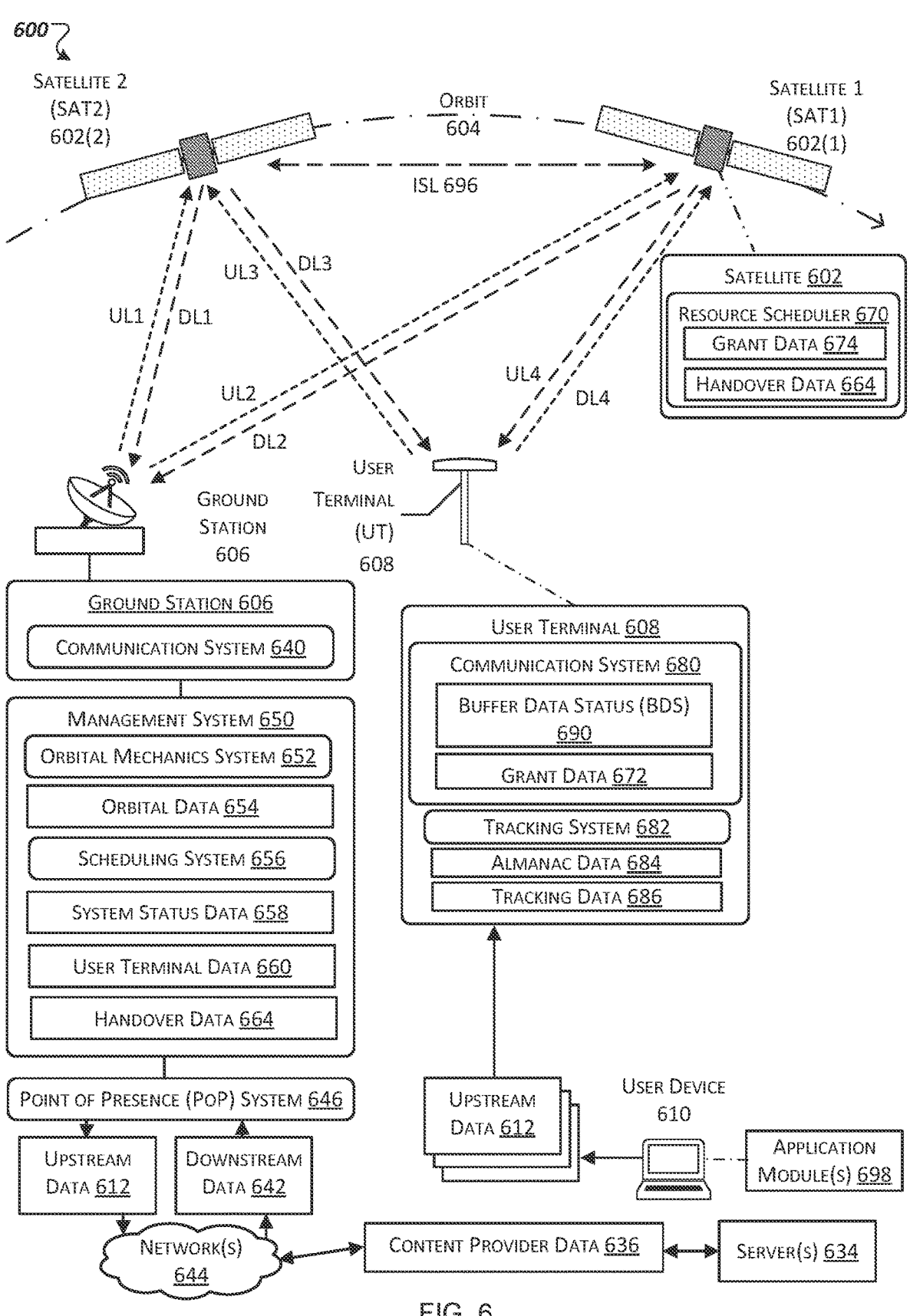
FIG. 6 illustrates a portion of a communication system that includes two satellites of a constellation of satellites, each satellite being in orbit, according to embodiments of the present disclosure.

FIG. 6 illustrates a portion of a communication system 600 that includes two satellites of a constellation of satellites, each satellite being in orbit, according to embodiments of the present disclosure. The communication system 600 shown here comprises a plurality (or "constellation") of satellites 602(1), 602(2), . . . , 602(S), each satellite 602 being in orbit 604. Also shown is a ground station 606, user terminals (UTs) 608, and user devices 610. Each user device 610 may execute one or more application modules 698. For example, the application modules 698 may comprise email applications, telephony applications, videoconferencing applications, telemetry applications, web browser applications, and so forth.

The constellation may comprise hundreds or thousands of satellites 602, in various orbits 604. For example, one or more of these satellites 602 may be in NGOs in which they are in constant motion with respect to the Earth, such as a low earth orbit (LEO). In this illustration, orbit 604 is depicted with an arc pointed to the right. A first satellite (SAT1) 602(1) is leading (ahead of) a second satellite (SAT2) 602(2) in the orbit 604. The satellite 602 is discussed in more detail with regard to FIG. 8.

With regard to FIG. 6, the uplink is a communication link that allows data to be sent to a satellite 602 from a ground station 606, UT 608, or device other than another satellite 602. Uplinks are designated as UL1, UL2, UL3, and so forth. For example, UL1 is a first uplink from the ground station 606 to the second satellite 602(2). In comparison, a downlink is a communication link, which allows data to be sent from the satellite 602 to a ground station 606, UT 608, or devices other than another satellite 602. For example, DL1 is a first downlink from the second satellite 602(2) to the ground station 606. The satellites 602 may also be in communication with one another. For example, an intersatellite link (ISL) 696 provides for communication between satellites 602 in the constellation. In some embodiments, one or more of the various features depicted in FIG. 6 is optional for carrying out all the features described herein.

One or more ground stations 606 are in communication with one or more satellites 602. The ground stations 606 may pass data between the satellites 602, a management system 650, networks 644 such as the Internet, and so forth. The ground stations 606 may be emplaced on land, on vehicles, at sea, and so forth. Each ground station 606 may comprise a communication system 640. Each ground station 606 may use the communication system 640 to establish communication with one or more satellites 602, other ground stations 606, and so forth. The ground station 606 may also be connected to one or more communication networks 644. For example, the ground station 606 may connect to a terrestrial fiber optic communication network 644. The ground station 606 may act as a network gateway, passing data between the one or more communication networks 644 and the satellites 602. Such data may be processed by the ground station 606 and communicated via the communication system 640. The communication system 640 of a ground station 606 may include components similar to those of the communication system of a satellite 602 and may perform similar communication functionalities. For example, the communication system 640 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 606 are in communication with a management system 650. The management system 650 is also in communication, via the ground stations 606, with the satellites 602 and the UTs 608. The management system 650 coordinates the operation of the satellites 602, ground stations 606, UTs 608, and other resources of the system 600. The management system 650 may comprise one or more of an orbital mechanics system 152 or a scheduling system 656. The management system 650 may comprise one or more servers or other computing devices.

The orbital mechanics system 652 determines orbital data 654 indicative of a state of a particular satellite 602 at a specified time. In one implementation, the orbital mechanics system 652 may use orbital elements that represent characteristics of the orbit 604 of the satellites 602 in the constellation to determine the orbital data 654 that predicts location, velocity, and so forth of particular satellites 602 at particular times or time intervals. For example, the orbital mechanics system 652 may use data obtained from actual observations from tracking stations, data from the satellites 602, scheduled maneuvers, and so forth to determine the orbital elements. The orbital mechanics system 652 may also consider other data, such as space weather, collision mitigation, orbital elements of known debris, and so forth.

The scheduling system 656 schedules resources to provide communication to the UTs 608. For example, the scheduling system 656 may determine handover data 664 that indicates when communication is to be transferred from the first satellite 602(1) to the second satellite 602(2). Continuing the example, the scheduling system 656 may also specify communication parameters such as frequency, timeslot indicative of when the transmission is permitted, and so forth. These communication parameters may be associated with the operation of an uplink to the satellite 602, a downlink from the satellite 602 to the UT 608, and so forth. During operation, the scheduling system 656 may use information such as the orbital data 654, system status data 658, user terminal data 660, and so forth.

The system status data 658 may comprise information such as which UTs 108 are currently transferring data, satellite availability, current satellites 602 in use by respective UTs 608, capacity available at particular ground stations 606, and so forth. For example, the satellite availability may comprise information indicative of satellites 602 that are available to provide communication service or those satellites 602 that are unavailable for communication service. Continuing the example, a satellite 602 may be unavailable due to malfunction, previous tasking, maneuvering, and so forth. The system status data 658 may be indicative of past status, predictions of future status, and so forth. For example, the system status data 658 may include information such as projected data traffic for a specified interval of time based on previous transfers of data. In another example, the system status data 658 may be indicative of future statuses, such as a satellite 602 being unavailable to provide communication service due to scheduled maneuvering, scheduled maintenance, scheduled decommissioning, and so forth.

The user terminal data 660 may comprise information such as a location of a particular UT 608. The user terminal data 660 may also include other information such as a priority assigned to data associated with UT 608, information about the communication capabilities of that particular UT 608, and so forth. For example, a particular UT 608 in use by a business may be assigned a higher priority relative to a UT 608 operated in a residential setting. Over time, different versions of UTs 608 may be deployed, having different communication capabilities such as being able to operate at particular frequencies, supporting different signal encoding schemes, having different antenna configurations, and so forth.

The handover data 664 is indicative of information such as a UT identifier indicative of a particular UT 608, a handover time indicative of when a handover is to occur, a next satellite identifier (ID) that is indicative of the next satellite 602 that will be providing communication service to the specified UT 608, and so forth. The handover data 664 facilitates an orderly transition of the UT 608 from a first satellite 602(1) to a second satellite 602(2).

The resource scheduling system 656 may determine handover data 664 at regular intervals. For example, handover data 664 may be generated for handover assessment intervals that are five seconds long. In other implementations, the handover data 664 may be determined on-demand, at irregular intervals, and so forth.

In one implementation, the handover data 664 may involve the resource scheduling system 656 using the orbital data 654 and the geolocation of the UTs 608 to determine which UTs 108 will be moving out of range of the satellites 602 currently providing communication services to those UTs 608. Based on the orbital data 654 and the geolocation of each UT 608, the next satellite 602 may be determined. For example, this may be a satellite 602 that is already in range, or will be in range, at the handover time. In some implementations, the handover data 664 may include a set of next satellites. For example, the handover data 664 may comprise a set of satellite IDs that indicate a primary satellite and a secondary satellite. Continuing the example, the second satellite 602(2) may be designated as the primary satellite expected to begin providing communication service to the UT 608 at the handover time. In the event that satellite 602(2) is unable to allocate resources to provide communication service to the UT 608, exception data indicative of this may be generated and provided to one or more of the network management system 650, the secondary satellite 602(3), the UT 608, or other devices. For example, the second satellite 602(2) may use an ISL 196 to send the exception data to the first satellite 602(1) and the secondary satellite 602(3). The first satellite 602(1) may send the exception data to the UT 608. The secondary satellite 602(3) may then allocate resources to provide communication service to the UT 608, and may subsequently provide the communication service beginning at the handover time.

In some implementations, the management system 650 may include an unsolicited grant system that accepts scheduling input data and determines unsolicited grant data. The unsolicited grant specifies communication resources for the uplink that are assigned to the UT, such as a timeslot, frequency slots, and so forth. The unsolicited grant may be issued based on scheduling input data. The scheduling input data may comprise information about one or more of upstream data 612 or downstream data 642. For example, the unsolicited grant system of the management system 650 may analyze the upstream data 612 to a particular UT 608 and downstream data 642 from the particular UT 608 to determine the unsolicited grant data. In one implementation, a machine learning system may be trained to use the scheduling input data to determine if the UT 608 is likely to have upstream data 612 to transmit to the satellite 602. Based on the output from the machine learning system, an unsolicited grant may be issued.

In some implementations, the scheduling input data may include content provider data 636 that provides additional information about the data to be transferred. For example, content such as video content, streaming games, video calling, audio calling, and so forth, may be sent from a content provider server to a user device via the satellite and UT. This content may have a defined duration, such as movie length, scheduling length of a video call, specified size of data, and so forth. Responsive to a request for content, a content provider may send the content provider data 636 that indicates an expected duration of the content, expected downlink data rate, expected uplink data rate, and so forth. The resource scheduler 670 uses the content provider data 636 to issue unsolicited grant data. For example, unsolicited grants may be issued that are expected to be sufficient for upstream data, such as acknowledgment messages, to be returned to the server. Unsolicited grants may reduce the need to send a state of a buffer, such as a buffer depth status (BDS), thus reducing consumption of the uplink resources. Unsolicited grants also produce substantial reductions in overall latency. For example, to send upstream data with a solicited grant in this system, the UT sends a message (such as the BDS), which travels to the satellite, is processed, and the solicited grant then travels back to the UT. In comparison, with the unsolicited grant, the unsolicited grant is used to send the upstream data.

With regard to these various techniques, the UT can use a random access channel (RACH) to request additional uplink resources as called for by changing conditions. For example, if the UT receives additional upstream data having a highest priority, SBDS may be sent to the satellite to request additional solicited grants. The techniques may thus be operating concurrently, with solicited grants from BDS, unsolicited grants based on scheduling input data, and so forth.

During operation of the system 600, communication services provided to a UT 608 may be handed off from a first satellite 602(1) to a second satellite 602(2). In some implementations, the scheduling input data may be transferred to the second satellite 602(2). For example, content provider data 636 may be sent to the resource scheduler 670 executing on a satellite 602(2) that is scheduled to provide communication service to the UT 608. In some implementations, the scheduling input data may comprise state data associated with the operation of the resource scheduler 670, parameters of the machine learning system, and so forth.

The unsolicited grant data is indicative of one or more parameters associated with uplink communication between the UT 608 and the satellite 602. For example, the unsolicited grant data may indicate the satellite identifier, uplink frequency, assigned timeslot, signal encoding, and so forth.

The unsolicited grant system of the management system 650 may send the unsolicited grant data to the satellite 602 that is in communication with the UT 108. In one implementation, a resource scheduler 670 onboard the satellite 602 may then allocate uplink communication resources consistent with the unsolicited grant data and then send the unsolicited grant data to the UT 608. In another implementation, the resource scheduler 670 onboard the satellite 602 may receive first unsolicited grant data from the management system 650 and generate second unsolicited grant data. For example, the second unsolicited grant data may specify a particular frequency, timeslot, and so forth that is not specified in the first unsolicited grant data.

The resource scheduler 670 onboard the satellite 602 may use scheduling input data to determine grant data 674 that allocates communication resources associated with the uplink to the satellite 602. The grant data 674 may comprise the unsolicited grant data or solicited grant data. Once determined, the grant data 674 is provided to the UT 608. The unsolicited grant data is provided to the UT 608 without request. In comparison, the solicited grant data is provided in response to a message from the UT 608.

During operation of the system, a UT 608 is handed off from a first satellite 602(1) to a second satellite 602(2). In one implementation, state data indicative of a state of a resource scheduler 670(1) of the first satellite 102(1) may be sent to a resource scheduler 670(2) of the second satellite 602(2). In another implementation, the management system 650 may provide state data to the resource scheduler 670(2) of the second satellite 602(2).

The UT 608 includes a communication system 680, such as a satellite network interface, to establish communication with one or more satellites 602. The communication system 680 of the UT 608 may include components similar to those of a communication system of a satellite 602 and may perform similar communication functionalities. For example, the communication system 680 may include one or more modems, digital signal processors, power amplifiers, antennas (including at least one antenna that implements multiple antenna elements, such as a phased array antenna), processors, memories, storage devices, communications peripherals, interface buses, and so forth. The UT 608 passes data between the constellation of satellites 602 and the user device 610. The UT 608 may connect to the user device 610 using a second network interface. For example, the second network interface may comprise a wireless local area network, wired local area network, terrestrial wide area network, and so forth. The user device 610 may execute one or more application modules 698. The data includes upstream data 612 sent by the user device 610 or downstream data 642 that is addressed to the UT 608 or the user device 610. For example, during operation, the application module 698 may send upstream data 612 and receive downstream data 642. The upstream data 612 and the downstream data 642 each may comprise header data and payload data. The UT 608 may be fixed or in motion. For example, the UT 608 may be used at a residence, business, or on a vehicle such as a car, boat, aerostat, drone, airplane, and so forth.

The UT 608 includes a tracking system 682. The tracking system 682 uses almanac data 684 to determine tracking data 686. The almanac data 684 provides information indicative of orbital elements of the orbit 604 of one or more satellites 602. For example, the almanac data 684 may comprise orbital elements such as "two-line element" data for the satellites 602 in the constellation that are broadcast or otherwise sent to the UTs 608 using the communication system 680.

The tracking system 682 may use the current location of the UT 608 and the almanac data 684 to determine the tracking data 686 for the satellite 602. For example, based on the current location of the UT 608 and the predicted position and movement of the satellites 602, the tracking system 682 can calculate the tracking data 686. The tracking data 686 may include information indicative of azimuth, elevation, distance to the second satellite, time of flight correction, or other information associated with a specified time. The determination of the tracking data 686 may be ongoing. For example, the first UT 608 may determine tracking data 686 every 100 ms, every second, every five seconds, or at other intervals.

The UT 608 may send upstream data 612 using the system 600. For example, the upstream data 612 may originate from the UT 608, or may be received by the UT 608 from a user device 610. The upstream data 612 may comprise a single packet or other units of data transfer, or a set of packets or other units of data transfer. The upstream data 612 may be addressed to a device. The device that the upstream data 612 is addressed to and may be accessible using one or more networks 644, such as the Internet.

The uplink may comprise a plurality of channels. A channel may be a particular combination of one or more of a frequency, time division, modulation, access modalities, and so forth. During operation of the UT 608, an uplink management system 688 may be used to determine one or more messages, such as a buffer data status (BDS) 190. The uplink management system 688 may send these messages using one or more of the channels.

The uplink may comprise a random access channel (RACH). The RACH may be random access in that individual UTs 608 may utilize the RACH on an ad hoc basis without prior knowledge of whether other UTs 608 may be transmitting at that time. The RACH provides the advantage of allowing for on-demand access to the satellite 602, increasing utilization. However, the RACH is susceptible to congestion if too many UTs 608 attempt to use the RACH at the same time. If the RACH is congested, messages from the UT 608 to the satellite 602 may not be received, may be retransmitted, and so forth.

The uplink may also include one or more grant channels. Depending upon the implementation, a UT 608 may be allocated one or more grant channels. A grant channel is specified by communication resources specified by the grant data 672. For example, grant data 672 may specify communication resources for the uplink that are assigned to the UT 608, such as a timeslot, frequency slot, modulation, coding scheme, and so forth. The resource scheduler 670 determines the grant data 672 that allocates these communication resources.

During operation, the uplink management system 688 may maintain one or more buffer groups. Each buffer group comprises a buffer queue to store upstream data 612 for transmission to the satellite 602 on the uplink. Each buffer group may be associated with an amount of data that is greater than or equal to zero. Each of these buffer groups may be associated with a particular characteristic. For example, the buffer groups may be associated with priority such that buffer group 0 is associated with highest priority data. Continuing the example, buffer group 5 may be associated with data having a lesser priority than buffer group 0. Priority for data in a buffer group may be determined based on a variety of factors, such as quality of service (QoS) flags for associated data, prior delays in transmission, and so forth. For example, the remaining unsent data in buffer group 7 at a first time may be moved to buffer group 4 at a second time.

The uplink management system 688 may use the RACH to send a message such as the buffer data status (BDS) 690 to the satellite. The BDS 690 may be relatively short, minimizing the overall size of the data transmitted. For example, the BDS 690 may be 8 bits in length. This reduces transmission time, reducing contention on the RACH. In some implementations, the uplink management system 688 may send a BDS 690 responsive to one or more buffer groups having an amount of data enqueued that exceeds a threshold value. For example, if no upstream data 612 has been enqueued for transmission, no BDS 690 is sent.

The BDS 690 provides information about upstream data 612 that a UT 108 has stored for transmission to the satellite 602 on the uplink. This information may include one or more of priority, an approximate amount of that data, and so forth. The priority may be designated by a particular buffer group. In one implementation, the uplink management system 688 may indicate the highest priority buffer group that has a nonzero amount of data. For example, if eight levels of priority, or eight buffer groups, are specified in the system, 3 bits in the BDS 690 may be used to indicate the highest priority buffer group that has a nonzero amount of data. The approximate amount of the data in the specified buffer group may be used to reduce the size of the BDS 690. For example, if the BDS 690 allocates 5 bits for an approximate amount of data used, there are 32 possible "bins" of quantities of data that may be expressed. Continuing the example, bin 1 may specify an amount of data of 1-10 kb, bin 2 may be 11-100 kb, bin 3 may be 101-5000 kb, and so forth.

Responsive to the BDS 690 indicating a non-zero amount of data to transfer, the resource scheduler 670 onboard the satellite 602 may issue grant data 672 such as solicited grant data 674. The solicited grant data 674 specifies communication resources for the uplinks that are assigned to the UT 608 that is associated with the BDS 690. The UT 608 receives the solicited grant data 674, and sends the upstream data 612 that is associated with the SBDS 690. Continuing the example, at least some of the upstream data 612 stored in the specified buffer group may be transmitted.

During operation, the UT 108 may continue to receive or generate upstream data 612 to send to the satellite 602. The uplink management system 688 of the UT 608 may send BDS 690 messages to the satellite 102. The longer BDS 690 messages may comprise more detailed information about the priority and amount of upstream data 612 that has been stored for transmission. This additional information in the BDS 690 assists the resource scheduler 670 onboard the satellite 602 in determining the solicited grant data 674 that maintains desired service level specifications for the different priorities of upstream data 612. For example, the BDS

690 may comprise a first octet that indicates which of the specified buffer groups have a nonzero amount of data for transmission. The BDS 690 also includes detailed information about the amount of data in the specified buffer groups. For example, additional octets may be used, one octet comprising data indicative of the amount of data stored in that buffer group.

In some implementations, the BDS 690 messages may be sent to the satellite 602 using the previously granted uplink communication resources. This avoids the need to send an additional request using the RACH, thus reducing congestion on the RACH.

The various techniques described in this disclosure may operate concurrently with one another. For example, a BDS 690 may be sent using the RACH while other upstream data 612 is being sent on the uplink using solicited grant data 674 responsive to BDS 690 or unsolicited grant data.

The system 600 may include one or more PoP systems 646. Each PoP system 646 may comprise one or more servers or other computing devices. Separate PoP systems 646 may be located at different locations. In one implementation, a PoP system 646 may be associated with providing service to a plurality of UTs 608 that are located in a particular geographic region.

The PoP systems 646 may manage communication between the system 600 and the network 644. For example, a first PoP system 646 may receive the upstream data 612 and send that upstream data 612 to the network 644. In another example, the first PoP system 646 may receive the downstream data 642 and proceed to attempt delivery of the downstream data 642 to the UT 608.

The PoP system 646 is in communication with one or more ground stations 606(1), 606(2), . . . , 606(G), and the management system 650. In some implementations, one or more functions may be combined. For example, the PoP system 646 may perform one or more functions of the management system 650. In another example, the PoP system 646 may be included in an integrated ground station 606.

One or more servers 634 may communicate with the POP system 646 via the network(s) 644. The servers 634 may provide various functions, such as content delivery, navigation, data storage and retrieval, and so forth. For example, the servers 634 may store video content that may be requested and streamed to a user device 610. In some implementations, the servers 634 may provide content provider data 636. The content provider data 636 may be used by the unsolicited grant system 666, resource scheduler 670, or other portions of the system 600 to facilitate operation. For example, the unsolicited grant system 666 or the resource scheduler 670 may determine and send unsolicited grant data to a UT 608 based on the content provider data 636.

The satellite 602, the ground station 606, the user terminal 608, the user device 610, the management system 650, the PoP system 646, or other systems described herein may include one or more computer devices or computer systems comprising one or more hardware processors, computer-readable storage media, and so forth. For example, the hardware processors may include application-specific integrated circuits (ASICs), field programmable gate arrays (FPGAs), digital signal processors (DSPs), and so forth. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 644. For example, the transitory machine-readable signal may comprise transmission of software by the Internet.

FIG. 7 is a functional block diagram 700 of some systems associated with the satellite 602, according to some implementations. The satellite 602 may comprise a structural system 702, a control system 704, a power system 706, a maneuvering system 708, one or more sensors 710, and a communication system 712. A pulse per second (PPS) system 714 may be used to provide a timing reference to the systems onboard the satellite 702. One or more buses 716 may be used to transfer data between the systems onboard the satellite 702. In some implementations, redundant buses 716 may be provided. The buses 716 may include, but are not limited to, data buses such as Controller Area Network Flexible Data Rate (CAN FD), Ethernet, Serial Peripheral Interface (SPI), and so forth. In some implementations, the buses 716 may carry other signals. For example, a radio frequency bus may comprise a coaxial cable, waveguides, and so forth to transfer radio signals from one part of the satellite 602 to another. In other implementations, some systems may be omitted, or other systems added. One or more of these systems may be communicatively coupled with one another in various combinations.

The structural system 702 comprises one or more structural elements to support operation of the satellite 602. For example, the structural system 702 may include trusses, struts, panels, and so forth. The components of other systems may be affixed to, or housed by, the structural system 702. For example, the structural system 702 may provide mechanical mounting and support for solar panels in the power system 706. The structural system 702 may also provide for thermal control to maintain components of the satellite 702 within operational temperature ranges. For example, the structural system 702 may include louvers, heat sinks, radiators, and so forth.

The control system 704 provides various services, such as operating the onboard systems, resource management, providing telemetry, processing commands, and so forth. For example, the control system 704 may direct operations of the communication system 712. The control system 704 may include one or more flight control processors 720. The flight control processors 720 may comprise one or more processors, FPGAs, and so forth. A tracking, telemetry, and control (TTC) system 722 may include one or more processors, radios, and so forth. For example, the TTC system 722 may comprise a dedicated radio transmitter and receiver to receive commands from a ground station 606, send telemetry to the ground station 606, and so forth. A power management and distribution (PMAD) system 724 may direct operations of the power system 706, control distribution of power to the systems of the satellite 602, control battery 734 charging, and so forth.

The power system 706 provides electrical power for operations of the components onboard the satellite 602. The power system 706 may include components to generate electrical energy. For example, the power system 706 may comprise one or more photovoltaic arrays 730 comprising a plurality of photovoltaic cells, thermoelectric devices, fuel cells, and so forth. One or more PV array actuators 732 may be used to change the orientation of the photovoltaic array(s) 730 relative to the satellite 602. For example, the PV array actuator 732 may comprise a motor. The power system 706 may include components to store electrical energy. For example, the power system 706 may comprise one or more batteries 734, fuel cells, and so forth.

The maneuvering system 708 maintains the satellite 602 in one or more of a specified orientation or orbit 604. For example, the maneuvering system 708 may stabilize the satellite 602 with respect to one or more axes. In another example, the maneuvering system 708 may move the satellite 602 to a specified orbit 604. The maneuvering system 708 may include one or more of reaction wheel(s) 740, thrusters 742, magnetic torque rods 744, solar sails, drag devices, and so forth. The thrusters 742 may include, but are not limited to, cold gas thrusters, hypergolic thrusters, solid-fuel thrusters, ion thrusters, arcjet thrusters, electro-thermal thrusters, and so forth. During operation, the thrusters 742 may expend propellant. For example, an electro-thermal thruster may use water as propellant, using electrical power obtained from the power system 706 to expel the water and produce thrust. During operation, the maneuvering system 708 may use data obtained from one or more of the sensors 710.

The satellite 602 includes one or more sensors 710. The sensors 710 may include one or more engineering cameras 750. For example, an engineering camera 750 may be mounted on the satellite 602 to provide images of at least a portion of the photovoltaic array 730. Accelerometers 752 provide information about the acceleration of the satellite 602 along one or more axes. Gyroscopes 754 provide information about the rotation of the satellite 602 with respect to one or more axes. The sensors 710 may include a global navigation satellite system (GNSS) 756 receiver, such as a Global Positioning System (GPS) receiver, to provide information about the position of the satellite 602 relative to Earth. In some implementations, the GNSS 756 may also provide information indicative of velocity, orientation, and so forth. One or more star trackers 758 may be used to determine an orientation of the satellite 602. A coarse sun sensor 760 may be used to detect the sun, provide information on the relative position of the sun with respect to the satellite 602, and so forth. The satellite 602 may include other sensors 710 as well. For example, the satellite 602 may include a horizon detector, radar, lidar, and so forth.

The communication system 712 provides communication with one or more other devices, such as other satellites 602, ground stations 606, user terminals 608, and so forth. The communication system 712 may include one or more modems 776, digital signal processors, power amplifiers, antennas (including at least one antenna that implements multiple antenna elements, such as a phased array antenna) 782, processors, memories, storage devices, communications peripherals, interface buses, and so forth. Such components support communications with other satellites 602, ground stations 606, user terminals 608, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 712 may be output to other systems, such as to the control system 704, for further processing. Output from a system, such as the control system 704, may be provided to the communication system 712 for transmission.

Each satellite may use one or more antennas 782 or antenna elements to provide a beam for transmission and reception of radio signals. For example, the satellite 602 may have a phased array antenna that allows for gain in a particular direction. Compared to a non-directional radiator, this gain directs the energy of transmitted radio frequency signals in that particular direction. This increases the strength of the signal at a receiver in the UT 608, ground station 606, and so forth. Likewise, the gain results in improved received signal strength at the satellite 602.

The beam provided by the satellite 602 may comprise a plurality of sub-beams. Subbeams on a satellite 602 may use different frequencies, timeslots, and so forth, to communicate with the UT 608. Each subbeam provides coverage of a particular geographic area or "footprint." Compared to a single beam, subbeams provide several advantages. For example, by using subbeams, radio frequencies may be reused by the same satellite 602 and other satellites 602 to service different areas. This allows an increased density of UTs 608 and bandwidth.

During a pass over of a particular location on the Earth, each subbeam may be targeted to a geographic location on the Earth. While that target geographic location is in range of the satellite 602, the subbeam tracks the target location. As the satellite 602 moves in orbit 604, the boundary of the footprint may change due to the relative angle between the satellite 602 and the Earth. For example, the footprint boundary may change from approximately an oval shape while the satellite 602 is low on the horizon relative to the target location, a circular shape while directly overhead, then an oval shape as the satellite 602 nears the opposite horizon. As the satellite 602 moves, a subbeam may be retargeted to another target location. In this configuration, instead of the subbeam sweeping along the ground track of the satellite 602, the subbeam loiters on a first area relative to the Earth, then is redirected to a second area.

In some implementations, a particular modem 776 or set of modems 776 may be allocated to a particular subbeam. For example, a first modem 776(1) provides communication to UTs 608 in a first geographic area using a first subbeam, while a second modem 776(2) provides communication to UTs 608 in a second geographic area using a second subbeam.

The communication system 712 may include hardware to support the intersatellite link 696. For example, an intersatellite link FPGA 770 may be used to modulate data that is sent and received by an ISL transceiver 772 to send data between satellites 702. The ISL transceiver 772 may operate using radio frequencies, optical frequencies, and so forth.

A communication FPGA 774 may be used to facilitate communication between the satellite 602 and the ground stations 606, UTs 608, and so forth. For example, the communication FPGA 774 may direct operation of a modem 776 to modulate signals sent using a downlink transmitter

778 and demodulate signals received using an uplink receiver(s) 780. The satellite 602 may include one or more antennas 782. For example, one or more parabolic antennas may be used to provide communication between the satellite 602 and one or more ground stations 606. In another example, a phased array antenna may be used to provide communication between the satellite 602 and the UTs 608.

The communication system 712 may include a resource scheduler 670 that specifies uplink resources for a UT 608 to communicate with the satellite 602. The resource schedule 670 may include one or more of a grant system 784 (or separate grant systems for solicited grants and unsolicited grants. For example, the communication FPGA 774 may process a message such as a BDS 690 that is received from a UT 608 by the uplink receiver 780. Responsive to the message, and subject to the availability of communication resources associated with the uplink, the grant system 784 of the resource scheduler 670 executing on the communications FPGA 774 may determine solicited grant data 674. The unsolicited grant system 666 of the resource scheduler 670 may also determine and send unsolicited grant data based on the scheduling input data. The grant data 672 is then sent using the downlink transmitter 778.

Figure 8:
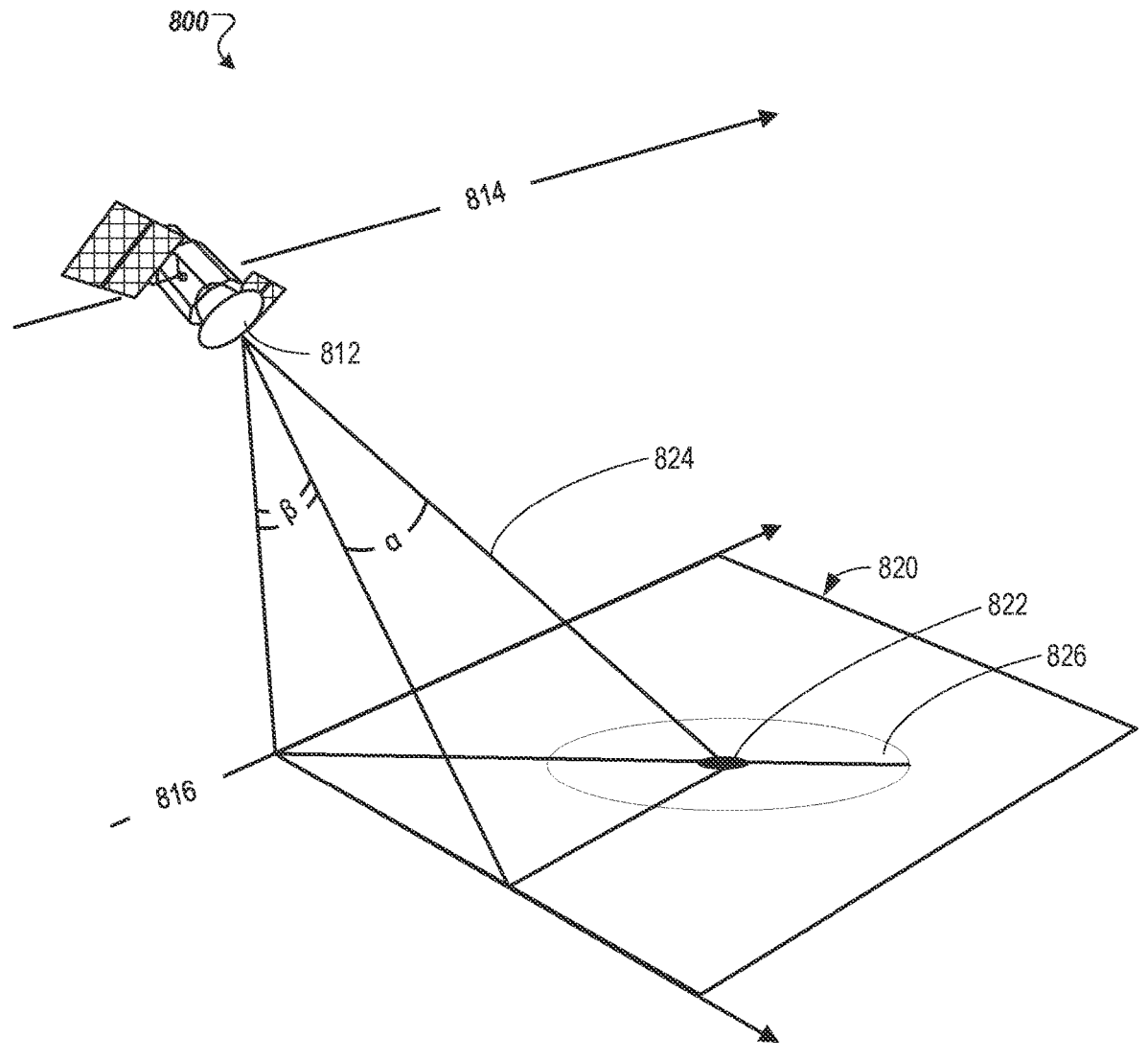
FIG. 8 illustrates a satellite including an antenna system that is steerable, according to embodiments of the present disclosure.

FIG. 8 illustrates a satellite 800, including an antenna system 812 that is steerable (e.g., phased array antenna), according to embodiments of the present disclosure. The satellite 800 can include the one or more aspects of the hierarchical handover signaling system 100-300 of FIG. 1-3, respectively, as well as other communication devices described herein. The antenna system 812 may include multiple beamforming circuitry, including antenna elements that form an antenna and that can be mechanically or electrically steered (e.g., using an antenna gain pattern to direct a main lobe toward a target location) individually, collectively, or a combination thereof. For example, the antenna is a phased array antenna.

In orbit 604, the satellite 800 follows a path 814, the projection of which onto the surface of the Earth forms a ground path 816. In the example illustrated in FIG. 8, the ground path 816 and a projected axis extending orthogonally from the ground path 816 at the position of the satellite 800, together define a region 820 of the surface of the Earth. In this example, the satellite 800 is capable of establishing uplink and downlink communications with one or more of ground stations, user terminals, or other devices within the region 820. In some embodiments, the region 820 may be located in a different relative position to the ground path 816 and the position of the satellite 800. For example, the region 820 may describe a region of the surface of the Earth directly below the satellite 800. Furthermore, embodiments may include communications between the satellite 800, an airborne communications system, and so forth.

As shown in FIG. 8, a communication target 822 (e.g., a ground station, a user terminal, or a UT (such as an HD UT)) is located within the region 820. The satellite 800 controls the antenna system 812 to steer the transmission and reception of communications signals to selectively communicate with the communication target 822. For example, in a downlink transmission from the satellite 800 to the communication target 822, a signal beam 824 emitted by the antenna system 812 is steerable within an area 826 of the region 820. In some implementations, the signal beam 824 may include multiple subbeams. The extent of the area 826 defines an angular range within which the signal beam 824 is steerable, where the direction of the signal beam 824 is described by a beam angle "α" relative to a surface normal vector of the antenna system 812. In two-dimensional phased array antennas, the signal beam 824 is steerable in two dimensions, as described in FIG. 8 by a second angle "β" orthogonal to the beam angle α. In this way, the area 826 is a two-dimensional area within the region 820, rather than a linear track at a fixed angle determined by the orientation of the antenna system 812 relative to the ground path 816.

In FIG. 8, as the satellite 800 follows the path 814, the area 826 tracks along the surface of the Earth. In this way, the communication target 822, which is shown centered in the area 826 for clarity, is within the angular range of the antenna system 812 for a period of time. During that time, signals communicated between the satellite 800 and the communication target 822 are subject to bandwidth constraints, including but not limited to signal strength and calibration of the signal beam 824. In an example, for phased array antenna systems, the signal beam 824 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 9:
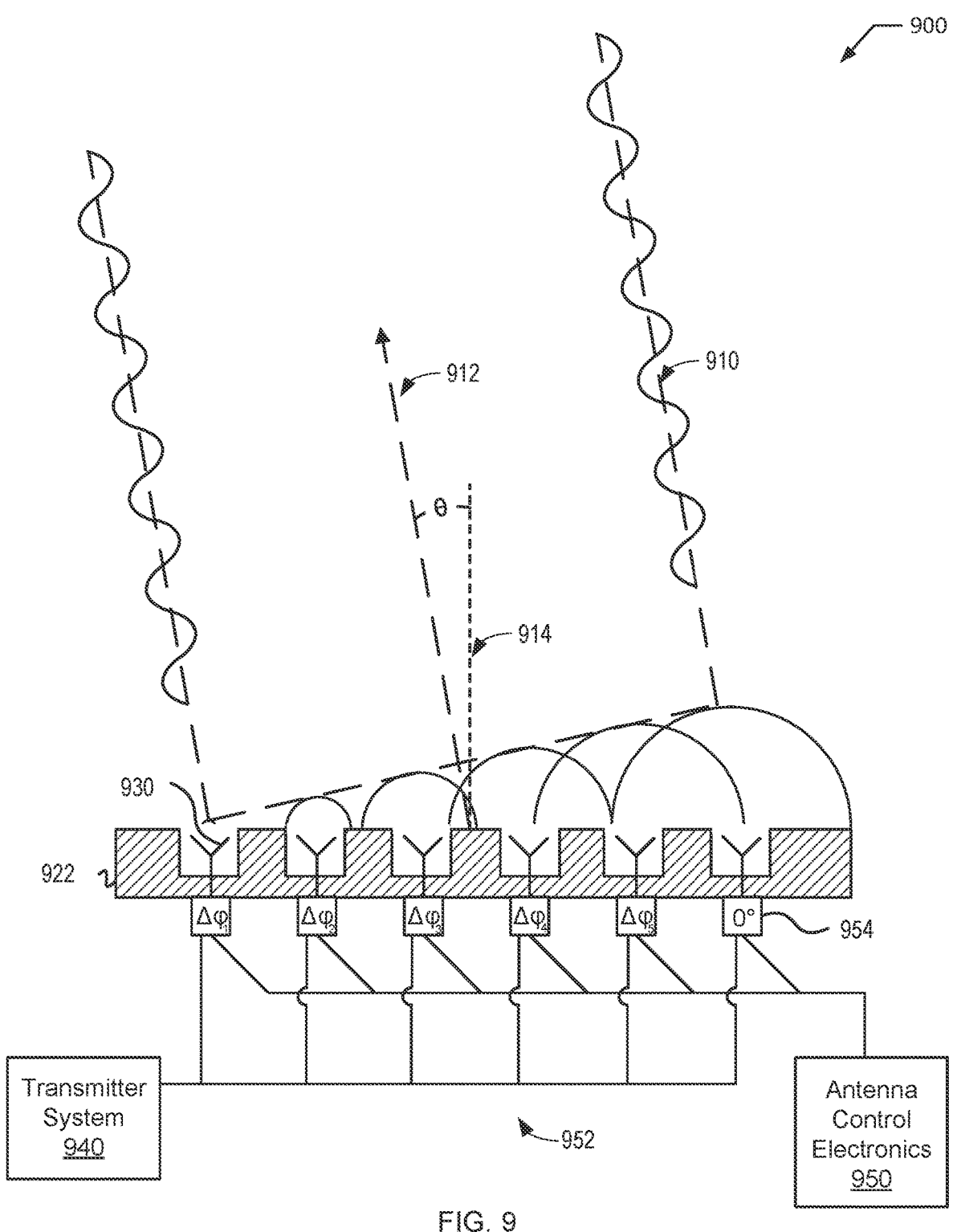
FIG. 9 illustrates a simplified schematic of an antenna, according to embodiments of the present disclosure.

FIG. 9 illustrates a simplified schematic of an antenna 900, according to embodiments of the present disclosure. The antenna 900 may be a component of the antenna system 812 of FIG. 8. As illustrated, the antenna 900 is a phased array antenna that includes multiple antenna elements 903. Interference between the antenna elements 930 forms a directional radiation pattern in both transmitter and receiver arrays, forming a beam 910 (beam extents shown as dashed lines). The beam 910 is a portion of a larger transmission pattern (not shown) that extends beyond the immediate vicinity of the antenna 900. The beam 910 is directed along a beam vector 912, described by an angle "θ" relative to an axis 914 normal to a surface of the antenna 900. As described below, the beam 910 is one or more of steerable or shapeable through control of operating parameters including, but not limited to, a phase and an amplitude of each antenna element 930.

In FIG. 9, the antenna 900 includes, within a transmitter section 922, the antenna elements 930, which may include, but are not limited to, omnidirectional transmitter antennas coupled to a transmitter system 940, such as the downlink transmitter 978. The transmitter system 940 provides a signal, such as a downlink signal to be transmitted, to a ground station on the surface. The downlink signal is provided to each antenna element 930 as a time-varying signal that may include several multiplexed signals. To steer the beam 910 relative to the axis 914, the phased array antenna system 900 includes antenna control electronics 950 controlling a radio frequency (RF) feeding network 952, including multiple signal conditioning components 954 interposed between the antenna elements 930 and the transmitter system 940. The signal conditioning components 954 introduce one or more of a phase modulation or an amplitude modulation, as denoted by "Ap" in FIG. 10, to the signal sent to the antenna elements 930. As shown in FIG. 9, introducing a progressive phase modulation produces interference in the individual transmission of each antenna element 930 that generates the beam 910.

The phase modulation imposed on each antenna element 930 can differ and can be dependent on a spatial location of a communication target that determines an optimum beam vector (e.g., where the beam vector 912 is found by one or more of maximizing signal intensity or connection strength).

The optimum beam vector may change with time as the communication target 822 moves relative to the phased array antenna system 900.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear in the description herein. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
receiving, by a wireless device from a first artificial satellite, first data indicating a state of network traffic of a first set of communication channels between the first artificial satellite and each of a set of user terminals (UTs) at a first time, prior to an event;
determining, by the wireless device, second data indicating a second time, after the first time, wherein the second time corresponds to the event, and wherein the second data further indicates a predicted position and a predicted velocity of the first artificial satellite at the second time, wherein:
the first artificial satellite is configured to exchange first data packets with a first UT of the set of UTs prior to the event; and
a second artificial satellite is configured to exchange second data packets with the first UT of the set of UTs subsequent to the event; and
sending, by the wireless device to the second artificial satellite, third data comprising the first data and the second data, wherein the third data comprises instructions that cause the second artificial satellite to allocate, based on the state of network traffic, a second set of communication channels between the second artificial satellite and each of the set of UTs at a third time, subsequent to the second time.

2. The method of claim 1, wherein the first data indicates a data buffer depth of corresponding data uplinks between the first artificial satellite and each of the set of UTs at the first time.

3. The method of claim 1, wherein at least a portion of first data packets are communicated between the first artificial satellite and the first UT via the wireless device.

4. The method of claim 3, further comprising:
determining, by the wireless device, fourth data indicating at least one or more of (i) historical communication patterns of the first UT or (ii) an operational state of the first UT, wherein the instructions of the second data further cause the second artificial satellite to allocate the second set of communication channels further using the fourth data.

5. The method of claim 1, wherein the wireless device is the first UT of the set of UTs.

6. The method of claim 1, further comprising
sending, by the first artificial satellite to the second artificial satellite, fourth data identifying the first UT, wherein the fourth data comprises instructions that cause the second artificial satellite to allocate a first data communication channel between the second artificial satellite and the first UT at a fourth time before the third time.

7. The method of claim 1, further comprising:
sending by the first artificial satellite to the second artificial satellite using an intersatellite link (ISL), fifth data comprising a copy of the first data.

8. The method of claim 1, further comprising:
receiving, by the wireless device from the second artificial satellite, a decryption key associated with decrypting the second data packets; and
sending, by the wireless device to each of the each of the UTs at the second time, the decryption key.

9. A wireless device, comprising:
radio frequency (RF) circuitry; and
one or more processors coupled to the RF circuit and executing instructions to:
receive, from a first artificial satellite, first data indicating a state of network traffic of a first set of communication channels between the first artificial satellite and each of a set of user terminals (UTs) at a first time, prior to an event, wherein the first data further indicates a data buffer depth of corresponding data uplinks between the first artificial satellite and each of the set of UTs at the first time;
determine second data indicating a second time, after the first time, wherein the second time corresponds to the event, wherein:
the first artificial satellite is configured to exchange first data packets with a first UT of the set of UTs prior to the event; and
a second artificial satellite is configured to exchange second data packets with the first UT of the set of UTs subsequent to the event; and
send, to the second artificial satellite, third data indicating the first data and the second data, wherein the third data comprises instructions that cause the second artificial satellite to allocate, based on the state of network traffic, a second set of communication channels between the second artificial satellite and each of the set of UTs at a third time, subsequent to the second time.

10. The wireless device of claim 9, wherein the second data indicates a predicted position and a predicted velocity of the first artificial satellite at the second time.

11. The wireless device of claim 9, wherein at least a portion of first data packets are communicated between the first artificial satellite and the first UT via the wireless device.

12. The wireless device of claim 11, wherein the one or more processors execute instructions to further:
determine fourth data indicating at least one or more of (i) historical communication patterns of the first UT of the set of UTs or (ii) an operational state of the first UT, wherein the instructions of the second data further cause the second artificial satellite to allocate the second set of communication channels further using the fourth data.

13. The wireless device of claim 9, wherein the wireless device is the first UT of the set of UTs.

14. The wireless device of claim 9, wherein the one or more processors execute instructions to further:
receive, from the second artificial satellite, a decryption key associated with decrypting the second data packets; and
send, to each of the each of the UTs at the second time, the decryption key.

15. The wireless device of claim 9, wherein the one or more processors execute instruction to further:
receive, from the first artificial satellite, fourth data identifying the first UT; and
send, to the second artificial satellite, the fourth data, wherein the fourth data comprises instructions that cause the second artificial satellite to allocate a first data communication channel between the second artificial satellite and the first UT at a fourth time before the third time.

* * * * *